US008892091B2

(12) United States Patent
Schmidt et al.

(10) Patent No.: US 8,892,091 B2
(45) Date of Patent: Nov. 18, 2014

(54) COMMUNICATION DEVICE, MOBILE TERMINAL METHOD FOR REQUESTING INFORMATION AND METHOD FOR PROVIDING INFORMATION

(75) Inventors: Andreas Schmidt, Braunschweig (DE); Maik Bienas, Braunschweig (DE); Achim Luft, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/603,565

(22) Filed: Sep. 5, 2012

(65) Prior Publication Data

US 2014/0066107 A1    Mar. 6, 2014

(51) Int. Cl.
*H04W 24/00* (2009.01)

(52) U.S. Cl.
USPC .......................... 455/423; 455/458; 455/67.11

(58) Field of Classification Search
USPC ........... 455/67.11, 411, 418, 423, 435.1, 436, 455/456.1–456.6, 458; 370/252
See application file for complete search history.

(56) References Cited

U.S. PATENT DOCUMENTS

| | | | |
|---|---|---|---|
| 2012/0015657 A1* | 1/2012 | Comsa et al. | 455/436 |
| 2012/0028611 A1* | 2/2012 | Wu | 455/411 |
| 2012/0083263 A1* | 4/2012 | Kim et al. | 455/423 |
| 2012/0113837 A1* | 5/2012 | Siomina et al. | 370/252 |
| 2012/0264449 A1* | 10/2012 | Kazmi et al. | 455/456.1 |
| 2012/0322386 A1* | 12/2012 | Yi et al. | 455/67.11 |
| 2013/0084809 A1* | 4/2013 | Johansson et al. | 455/67.11 |
| 2013/0084910 A1* | 4/2013 | Suzuki et al. | 455/515 |

FOREIGN PATENT DOCUMENTS

| | | |
|---|---|---|
| EP | 1971168 A1 | 9/2008 |
| WO | 2010/107775 A1 | 9/2010 |
| WO | 2011/102623 A2 | 8/2011 |

OTHER PUBLICATIONS

3GPP TS 37.320 V11.0.0 (Jun. 2012), 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11); pp. 1-20.
ETSI TS 137 320 V10.4.0 (Jan. 2012), Universal Mobile Telecommunications System (UMTS), LTE, Universal Terrestrial Radio Access (UTRA) and Evolved Universal Terrestrial Radio Access (E-UTRA), Radio measurement collection for Minimization of Drive Tests (MDT), Overall description, Stage 2, (3GPP TS 37.320 version 10.4.0 Release 10), pp. 1-20.
3rd Generation Partnership Project; "Technical Specification Group Radio Access Network; Study on Minimization of drive-tests in Next Generation Networks"; Release 9 , Technical Report, 3GPP TR 36.805, V2.0.0, Nov. 2009, 23 pages.
3rd Generation Partnership Project (3GPP); "Clarification on location information", Huawei, 3GPP TSG RAN2 Meeting #68, R2-096601, 13 pages, Nov. 2007.
International Search report and Written Opinion received for PCT Application No. PCT/EP2013/068014, mailed on Dec. 20, 2013, 14 pages.

* cited by examiner

*Primary Examiner* — Nathan Taylor
(74) *Attorney, Agent, or Firm* — Schwabe, Williamson & Wyatt, P.C.

(57) ABSTRACT

A communication device is provided comprising a message generator configured to generate a message indicating that a mobile terminal should provide data from which information about the configuration of the mobile terminal for the reception of paging messages is derivable and a transmitter configured to transmit the message.

22 Claims, 17 Drawing Sheets

COMMUNICATION DEVICE, MOBILE TERMINAL METHOD FOR REQUESTING INFORMATION AND METHOD FOR PROVIDING INFORMATION

TECHNICAL FIELD

The present disclosure relates to a communication device, a mobile terminal, a method for requesting information and a method for providing information.

BACKGROUND

For receiving a call or a message while being idle, a mobile terminal in a mobile communication network is typically paged by the network side, i.e. a paging message is sent by the network side to the mobile terminal. For mobile terminals being reachable, approaches are desirable that allow ensuring that paging messages are correctly received by a mobile terminal.

SUMMARY

A communication device is provided including a message generator configured to generate a message indicating that a mobile terminal should provide data from which information about the configuration of the mobile terminal for the reception of paging messages is derivable and a transmitter configured to transmit the message.

Further, a mobile terminal is provided including a receiver configured to receive a message indicating to the mobile terminal that the mobile terminal should provide data from which information about the configuration of the mobile terminal for the reception of paging messages is derivable, a determiner configured to determine data from which information about the configuration of the mobile terminal for the reception of paging messages is derivable and a transmitter configured to transmit the data to a communication device.

Additionally, methods according to the above communication device and the above mobile terminal are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

Figure 1:
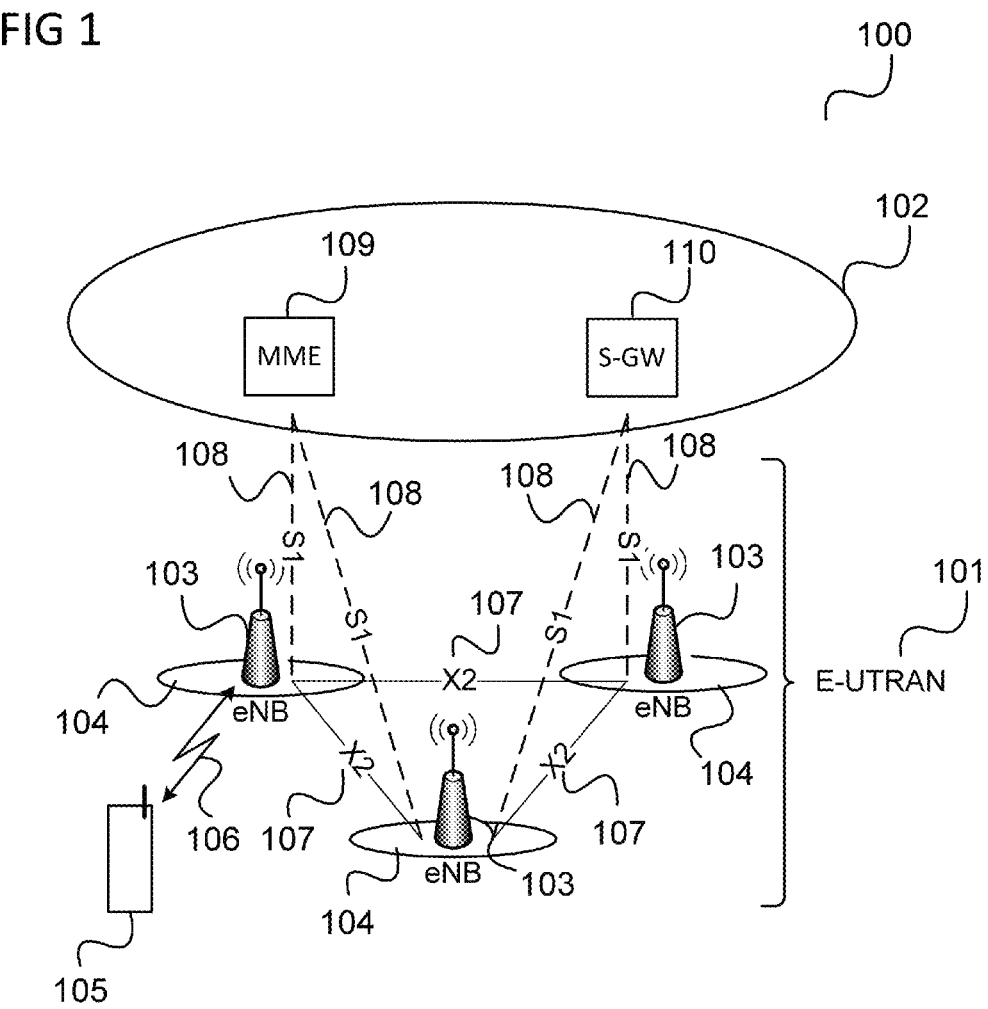
FIG. 1 shows a communication system.

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

3GPP (3rd Generation Partnership Project) has introduced LTE (Long Term Evolution) into the Release 8 version of UMTS (Universal Mobile Telecommunications System) standards.

The air interface of an LTE communication system is called E-UTRA (Evolved Universal Terrestrial Radio Access) and is commonly referred to as '3.9G'. In December 2010, the ITU recognized that current versions of LTE and other evolved 3G technologies that do not fulfill "IMT-Advanced" requirements could nevertheless be considered '4G', provided they represent forerunners to IMT-Advanced and "a substantial level of improvement in performance and capabilities with respect to the initial third generation systems deployed already. LTE is therefore sometime also referred to as '4G' (mainly for marketing reasons).

In comparison with its predecessor UMTS, LTE offers an air interface that has been further optimized for packet data transmission by improving the system capacity and the spectral efficiency. Among other enhancements, the maximum net transmission rate has been increased significantly, namely to 300 Mbps in the downlink transmission direction and to 75 Mbps in the uplink transmission direction. LTE supports scalable bandwidths of from 1.4 MHz to 20 MHz and is based on new multiple access methods, such as OFDMA (Orthogonal Frequency Division Multiple Access)/TDMA (Time Division Multiple Access) in downlink direction (tower, i.e. base station, to handset, i.e. mobile terminal) and SC-FDMA (Single Carrier-Frequency Division Multiple Access)/TDMA in uplink direction (handset to tower). OFDMA/TDMA is a multicarrier multiple access method in which a subscriber (i.e. a mobile terminal) is provided with a defined number of subcarriers in the frequency spectrum and a defined transmission time for the purpose of data transmission. The RF (Radio Frequency) capability of a mobile terminal according to LTE (also referred to as User Equipment (UE), e.g. a cell phone) for transmission and reception has been set to 20 MHz. A physical resource block (PRB) is the baseline unit of allocation for the physical channels defined in LTE. It includes a matrix of 12 subcarriers by 6 or 7 OFDMA/SC-FDMA symbols. At the physical layer a pair of one OFDMA/SC-FDMA symbol and one subcarrier is denoted as a 'resource element'.

A communication system that may for example be a communication system according to LTE is described in the following with reference to FIG. 1.

FIG. 1 shows a communication system 100.

The communication system 100 is a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment) 105 located in a mobile radio cell 104 may communicate with the core network 102 and with other mobile terminals 105 via the base station providing coverage in (in other words operating) the mobile radio cell. In other words, the base station 103 operating the mobile radio cell 104 in which the mobile terminal 105 is located provides the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 via a S1-MME interface and to a Serving Gateway (S-GW) 110 by means of an S1-U interface. The S1 interface supports a many-to-many relation between MMEs/S-GWs 109, 110 and the base stations 103, i.e. a base station 103 can be connected to more than one MME/S-GW 109, 110 and an MME/S-GW can 109, 110 be connected to more than one base station 103. This enables network sharing in LTE.

For example, the MME 109 may be responsible for controlling the mobility of mobile terminals located in the coverage area of E-UTRAN, while the S-GW 110 is responsible for handling the transmission of user data between mobile terminals 105 and core network 102.

In case of LTE, the radio access network 101, i.e. the E-UTRAN 101 in case of LTE, can be seen to consist of the base station 103, i.e. the eNBs 103 in case of LTE, providing the E-UTRA user plane (PDCP/RLC/MAC) and control plane (RRC) protocol terminations towards the UE 105.

An eNB 103 may for example host the following functions:
Functions for Radio Resource Management: Radio Bearer Control, Radio Admission Control, Connection Mobility Control, dynamic allocation of resources to UEs 105 in both uplink and downlink (scheduling);
IP header compression and encryption of user data stream;
Selection of an MME 109 at UE 105 attachment when no routing to an MME 109 can be determined from the information provided by the UE 105;
Routing of User Plane data towards Serving Gateway (S-GW) 110;
Scheduling and transmission of paging messages (originated from the MME);
Scheduling and transmission of broadcast information (originated from the MME 109 or O&M (Operation and Maintenance));
Measurement and measurement reporting configuration for mobility and scheduling;
Scheduling and transmission of PWS (Public Warning System, which includes ETWS (Earthquake and Tsunami Warning System) and CMAS (Commercial Mobile Alert System)) messages (originated from the MME 109);
CSG (Closed Subscriber Group) handling.

Each base station of the communication system 100 controls communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located (and on which it is camping). If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, control of the call may be transferred between neighboring mobile radio cells 104. The transfer of calls from mobile radio cell 104 to mobile radio cell 104 is termed handover (or handoff).

A handover may also occur between base stations 103 operating according to different radio access technologies (RATS). This is illustrated in FIG. 2.

Figure 2:
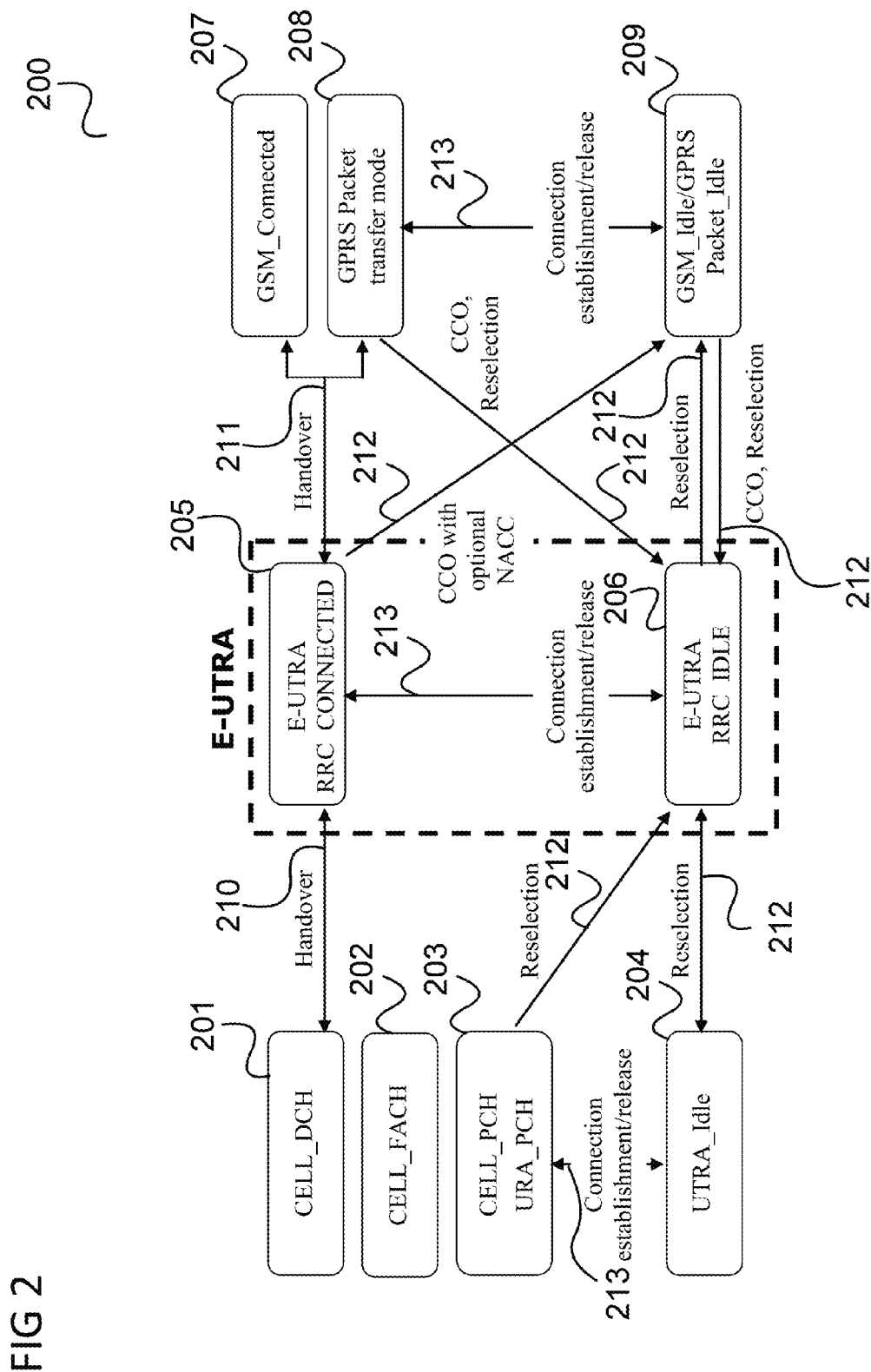
FIG. 2 shows a state diagram.

FIG. 2 shows a state diagram 200.

The state diagram 200 includes the UMTS (UTRA, 3G) mobile terminal states CELL_DCH 201, CELL_FACH 202, CELL_PCH/URA_PCH 203, and UTRA_Idle 204, the LTE (E-UTRA) mobile terminal states RRC CONNECTED 205 and RRC IDLE 206 and the GSM (GERAN, 2G and 2.5G) mobile terminal states GSM_Connected 207, GPRS Packet Transfer Mode 208, and GSM_Idle/GPRS Packet_Idle 209. Contrary to UMTS, there are only two E-UTRA RRC states defined for the mobile terminal 105. FIG. 2 can be seen to illustrate the mobility support between E-UTRA, UTRA and GERAN.

According to a first state transition 210, a handover may be carried out between E-UTRA (i.e. a base station 103 operating according to LTE) and UTRAN (i.e. a base station 103 operating according to UTMS).

According to a second state transition 211, a handover may be carried out between E-UTRA (i.e. a base station 103 operating according to LTE) and GERAN (i.e. a base station 103 operating according to GSM).

Third state transitions 212 may occur between states of the UTRAN, the GERAN, and the E-UTRAN, e.g. in case of cell reselection without the handover of an active call. It should be noted that state transitions between states of the UTRAN and GERAN are omitted for simplicity but may also be possible.

Fourth state transitions 213 may occur between states of the same radio access technology, e.g. when a connection is released or a connection is established. The mobile terminal 105 is in RRC_CONNECTED when an RRC connection has been established. If this is not the case, i.e. no RRC connection is established, the mobile terminal 105 is in RRC_IDLE state.

The two RRC (Radio Resource Control) states RRC_IDLE and RRC_CONNECTED in E-UTRA can be characterized as follows:

RRC IDLE
   Mobile terminal specific DRX (Discontinuous Reception) may be configured by upper protocol layers;
   Mobility is controlled by the mobile terminal 105;
   The mobile terminal 105
      may acquire system information (SI);
      monitors a paging channel to detect incoming calls and SI change;
      performs neighboring cell measurements for the cell (re-)selection process.

RRC_CONNECTED
   A mobile terminal 105 is in RRC_CONNECTED when an RRC connection has been established.
   Transfer of unicast data to/from the mobile terminal 105;
   Mobility is controlled by the radio access network 101 (handover and cell change order);
   The mobile terminal 105 may be configured with mobile terminal specific DRX (Discontinuous Reception) at lower protocol layers.
   The mobile terminal 105
      may acquire system information (SI);
      monitors a paging channel and/or SIB (system information block) Type 1 content to detect SI change;
      monitors control channels associated with the shared data channel to determine if data are scheduled for it;
      performs neighboring cell measurements and measurement reporting to assist the network in making handover decisions;
      provides channel quality and feedback information to the radio access network 101.

During work on 3GPP Rel-9 (Release 9) a Feasibility Study on Minimization of Drive Tests (MDT) for future LTE and HSPA (High Speed Packet Access) releases was conducted. In brief, the study aimed at assessing the feasibility, benefits and complexity of automating the collection of DL (downlink) signal strength measurements by the UE to minimize the need of conventional (manual) drive tests.

Conventional drive tests may be characterized as follows:
   UE-like test equipment is installed in cars and driven around by the Mobile Network Operator's (MNO) personnel and measurements are recorded.
   Sometimes additional attenuators are deployed to 'imitate' indoor reception.
   The MNO's measurements focus on latency (for both c-plane and u-plane), bit error rates (BER), call drops, and alike.

In contrast to this, MDT (as defined by 3GPP for LTE and HSPA releases starting with Release 10) means:
   The Mobile Network Operator (MNO) utilizes his customers' UEs out in the field to find out how bad or good network coverage is at a given location.
   The customer is generally not to be informed about ongoing MDT activities in his/her device.

Using conventional (manual) drive tests for network optimization purposes is costly and causes additional $CO_2$ emissions, so it is desirable to develop automated solutions to reduce the operator costs for network deployment and operation. The findings of the study item phase show that it is beneficial to collect UE measurements to enable a more efficient network optimization and it is feasible to use c-plane solutions (of the air interface) to acquire the information from the devices involved.

The key result of the MDT Feasibility Study can be seen in the following: Information collected by UEs pertaining to DL signal strength measurements, together with information available in the Radio Access Network (RAN) can be used by the MNO for network topology planning and coverage optimization purposes.

Detailed technical work on MDT was kicked-off for the 3GPP Rel-10 timeframe with the creation of an MDT Stage 2 description. During this work it became clear that existing measurement configuration methods and measurement reporting methods (defined for Radio Resource Management, RRM) are not sufficient and need to be enhanced to take MDT-specific requirements into account. At that time, the common understanding was that MDT measurements take place in the UE.

For Rel-11, 3GPP is currently in a process of enhancing the MDT functionality. Recently new use cases that are related to UL (Uplink) Coverage Optimizations, QoS Verification and IP Throughput Measurements have been identified. All these new use cases have in common that further measurements for MDT are required in certain CN (Core Network) or RAN (Radio Access Network) nodes (in addition to those measurements that take place in the UE itself).

In order to distinguish the MDT functionalities from the RRM functionalities, the terms
   MDT Configuration,
   MDT Measurements
      (including MDT UE Measurements and MDT NW Measurements),
and
   MDT Reporting
are used in the following (e.g. for the messages and information elements being exchanged over the network interfaces S1 108 and over the air interface Uu 106).

MDT Operation Modes on the UE Side
Based on the two RRC States RRC_IDLE and RRC_CONNECTED two types of MDT have been defined.
   Immediate-MDT: (defined for UEs in RRC_CONNECTED state):
      1. MDT Configuration
         is based on existing RRC signaling procedures
      2. MDT Measurements
         are taken immediately
      3. MDT Reporting
         is also done immediately
   Logged-MDT (defined for UEs in RRC_IDLE state):
      1. MDT Configuration
         a) is done by dedicated RRC signaling while the UE is in RRC_CONNECTED,
         b) remains valid in RRC_IDLE,
         c) is maintained during multiple RRC_IDLE->RRC_CONNECTED->RRC_IDLE state transitions
         d) is maintained while temporarily being in another RAT
      2. MDT Measurements are all done in RRC_IDLE and includes the following
         a) data collection
         b) storage of data
         c) log-file creation (for later submission from UE to E-UTRAN)
      3. MDT Reporting
         a) at a later point in time (when UE is back in RRC_CONNECTED again)

b) upon E-UTRAN request (using UEInformationRequest and UEInformationResponse RRC message pair)

MDT is not supported in wireless communication systems according to the GERAN (2G and 2.5G) suite of specifications, i.e. is not supported for the GSM 207, 208, 209. Immediate-MDT is supported in Cell_DCH 201 and RRC_CONNECTED 205. Logged-MDT is supported in Cell_PCH/URA_PCH 203, UTRA_Idle 204 and RRC_IDLE 206.

MDT Functionality on Network Side (i.e. On the Side of the Core Network (CN) and the Radio Access Network (RAN, e.g. The E-UTRAN))

The core network functionality for the configuration of MDT (including instructions what kind of devices should be selected for MDT measurements by an eNB, and where the collected MDT reports should be sent to) are based on the existing Trace functionality. This is illustrated in FIG. 3.

Figure 3:
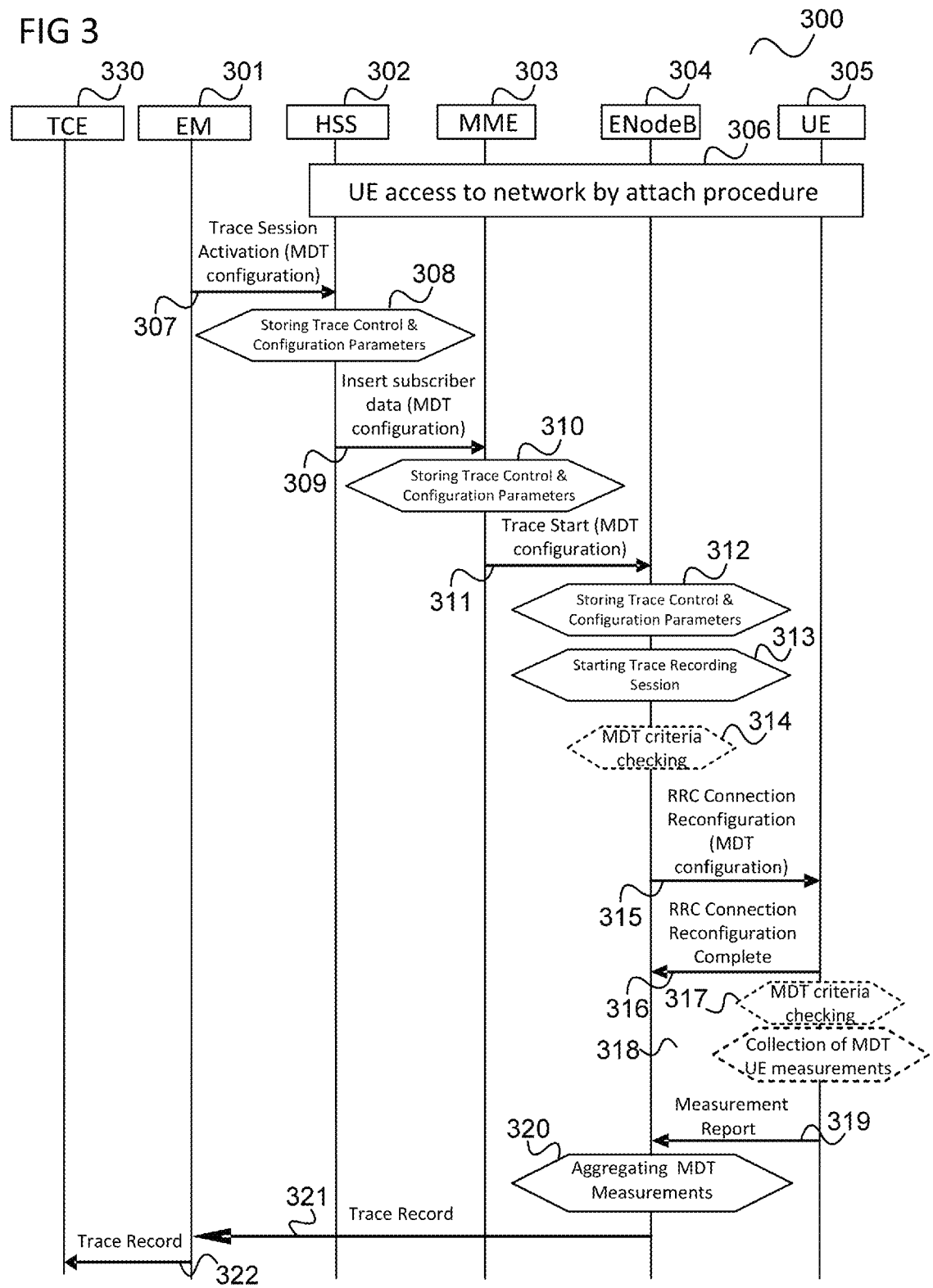
FIG. 3 shows a message flow diagram illustrating Trace-based MDT functionality on the network side.

FIG. 3 shows a message flow diagram 300 illustrating Trace-based MDT functionality on the network side.

The message flow takes place between an element manager (EM) 301, which is for example part of the core network 102, a home subscriber server (HSS) 302, which is for example part of the core network 102, an MME 303 (e.g. corresponding to MME 109), a base station 304 (e.g. corresponding to the eNB 103 serving the UE 105) and a UE 305 corresponding to UE 105. Further, a TCE (Trace Collection Element) 330 may be involved in the flow.

In 306, the UE 305 attaches to the network side (e.g. to E-UTRAN 101 and core network 102) by means of an attach procedure.

In 307, the EM transmits the MDT configuration for the UE 105 to the HSS 302 by means of a Trace Session Activation message.

In 308, the HSS 302 stores trace configuration parameters.
In 309, the HSS 302 forwards the MDT configuration to the MME 303.

In 310, the MME 303 stores the trace configuration parameters.

In 311, the MME 303 transmits the MDT configuration to the base station 304 by means of a trace start message.

In 312, the base station 304 stores the trace configuration parameters.

In 313, the base station 304 starts a Trace Recoding Session.

In 314, the base station 304 may optionally perform MDT criteria checking.

In 315, the base station 304 sends the MDT configuration to the UE 305 (via the air interface).

The UE 305 acknowledges the MDT configuration by means of an RRC Connection Reconfiguration Complete message in 316.

The UE 305 may optionally perform MDT criteria checking in 317.

In 318, the UE 305 performs MDT measurements according to the MDT configuration.

In 319, the UE reports the results of the MDT measurements to the base station 304 by means of a measurement report.

In 320, the base station 304 aggregates the MDT measurements and sends them to the EM 301 in 321 and 322.

In case that the TCE 330 is a separate entity from the EM 301, the EM 301 may then forward the MDT measurements to the TCE 330.

According to Rel-10 MDT does not require the base station 304 to measure anything; the only thing that the base station has to do is collect MDT measurements from the UE 305 and use the trace-based MDT reporting mechanisms to convey the MDT reports back to the TCE 330 which may for example be an MDT Server, According to Rel-11 some new measurement requirements (related to UL traffic characteristics) are put on certain CN or RAN nodes to realize the MDT Rel-11 enhancements (e.g. MDT NW Measurements for UL Coverage Optimizations, QoS Verification and IP Throughput Measurements).

In order to distinguish the MDT messages that are exchanged over the air interface form those MDT messages that are exchanged between core network entities, the following terms are used in the following to refer to messaging within the core network:
Trace-based MDT Configuration, and
Trace-based MDT Reporting.

In order to distinguish the MDT measurements that take place in the UE from those MDT measurements that take place in the CN and/or certain RAN nodes, the following two terms are used in the following:
MDT UE Measurements to refer to measurements for MDT performed by the UE, and
MDT NW Measurements to refer to measurements for MDT performed by certain CN or RAN nodes, primarily measurements of UL data transmissions to address the new use cases in Rel-11.

While examples are given in the following based on E-UTRA (i.e. LTE) and in most examples LTE terminology is used, it should be noted that the principles can also be adapted to the UTRA (i.e. UMTS) suite of standards. Physical layer parameters of the uplink radio access (as required for the UL Coverage Optimization use case) can be measured by the respective base station in both UMTS and LTE. However, because of the different protocol termination points in LTE and UMTS, it is not suitable to just replace "eNB" with "NB" when it comes to "higher layer" measurements for QoS Verification, IP Throughput Measurement, and alike. In UTRA these types of "higher layer" measurements (e.g., at application layer) can be done in the RNC at the earliest (rather than in the NB).

Another big disparity between UMTS and LTE can be seen in the different paging procedures that are described in the following.

Paging Procedure in UMTS

The Paging Channel (PCH) is a downlink transport channel. The PCH is transmitted over an entire radio cell. The transmission of the PCH is associated with the transmission of physical-layer generated Paging Indicators (PI), to support efficient sleep-mode procedures.

Paging Channel selection: System information block type 5 (SIB 5) defines common channels to be employed in Idle mode. In a cell, a single or several PCHs may be established. Each Secondary Common Control Physical Channel (SC-CPCH) indicated to the UE in system information may carry up to one PCH. And for each defined PCH there is one uniquely associated PICH (Paging Indicator Channel) also indicated. In case that more than a single PCH and associated PICH are defined in SIB 5, the UE performs a selection according to the following rule:

The UE selects a SCCPCH from the ones listed in SIB 5 based on IMSI (International Mobile Subscriber Identity) as follows:

"Index of selected SCCPCH"=IMSI mod K, where K is equal to the number of listed SCCPCHs which carry a PCH (i.e. SCCPCHs carrying FACH only shall not be counted). These SCCPCHs are indexed in the order of their occurrence in SIB 5 from 0 to K−1. "Index of selected SCCPCH" identifies the selected SCCPCH with the PCH and the uniquely associated PICH to be used by the UE. If the UE has no IMSI, for instance when making an emergency call without USIM, the UE uses as default number IMSI=0.

The UE may use Discontinuous Reception (DRX) in idle mode in order to reduce power consumption. When DRX is used the UE needs only to monitor one Page Indicator (PI) in one Paging Occasion (PO) per DRX cycle.

The Paging Indicator Channel (PICH) is a fixed rate (SF=256) physical channel used to carry the paging indicators. For detection of the PICH the UE obtains the phase reference form the CPICH and all mobile terminals in the radio cell listen to the PICH. Thus, the PICH needs to be sent at high power level without power control. The PICH is associated with an SCCPCH to which a PCH transport channel are mapped. The frame structure of the PICH is illustrated in FIG. 4.

Figure 4:
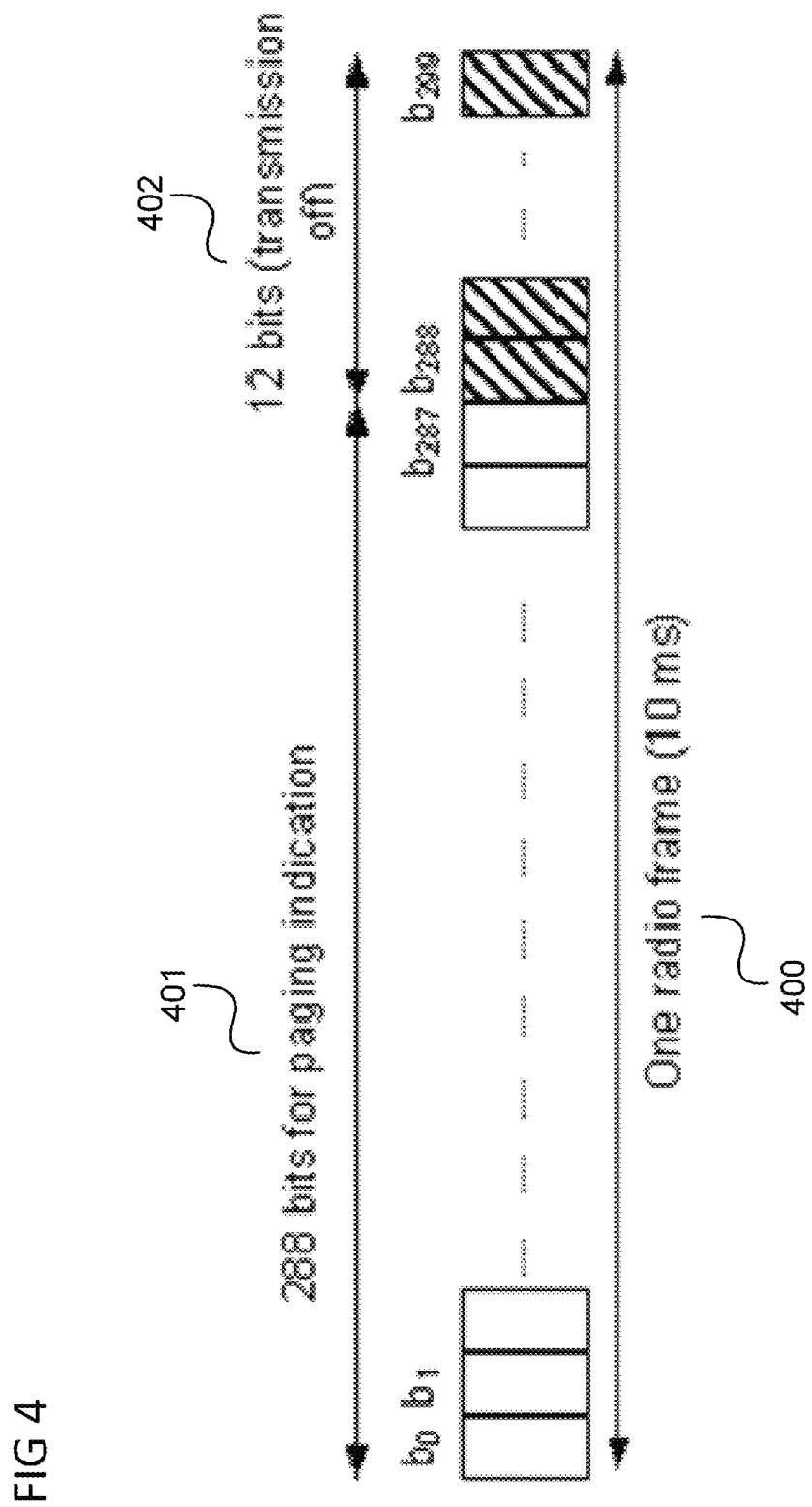
FIG. 4 shows a RICH frame structure.

FIG. 4 shows a PICH frame structure.

A PICH radio frame 400 of length 10 ms consists of 300 bits. Of these, 288 bits 401 are used to carry paging indicators. The remaining 12 bits 402 are not formally part of the PICH and are not transmitted (DTX). The part of the frame with no transmission is reserved for possible future use.

In UMTS, two Paging Procedures exist:
1) For Idle Mode UEs
This paging procedure is used to transmit paging information to selected UEs in idle mode, CELL_PCH or URA_PCH state using the paging control channel (PCCH). Upper layers in the network may request paging, for example to establish a signaling connection. UTRAN may initiate paging for UEs in CELL_PCH or URA_PCH state to trigger a cell update procedure. In addition, UTRAN may initiate paging for UEs in idle mode, CELL_PCH and URA_PCH state to trigger reading of updated system information. UTRAN initiates the paging procedure by transmitting a PAGING TYPE 1 message on an appropriate paging occasion on the PCCH.
2) For Connected Mode UEs
UE dedicated paging procedure is used to transmit dedicated paging information to one UE in connected mode in CELL_DCH or CELL_FACH state. Upper layers in the network may request initiation of paging. For a UE in CELL_PCH or CELL_FACH state, UTRAN initiates the procedure by transmitting a PAGING TYPE 2 message on the DCCH using the acknowledged mode (AM) of RLC.

In UMTS, two Paging Message Types exist:
PAGING TYPE 1 message is used to send information on the paging channel. One or several UEs, in idle or connected mode, can be paged in one message, which may also contain other information.
PAGING TYPE 2 message is used to page an UE in connected mode (CELL_DCH or CELL_FACH state), when using the DCCH for CN originated paging.

PICH/S-CCPCH Timing Relation

Figure 5:
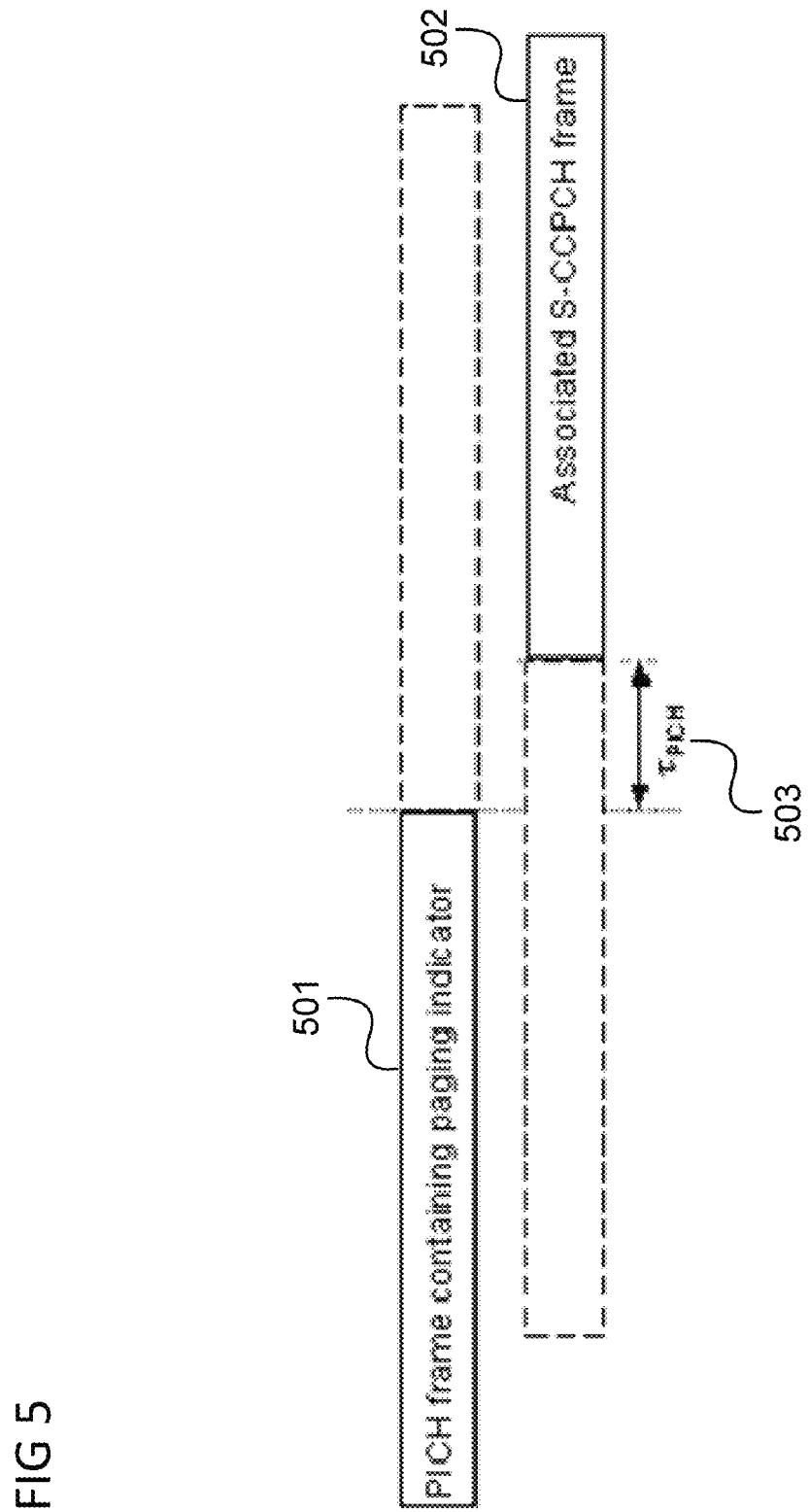
FIG. 5 shows a frame diagram.

The timing between a PICH frame and its associated single S-CCPCH frame, i.e. the S-CCPCH frame that carries the paging information related to the paging indicators in the PICH frame, is illustrated in FIG. 5. It should be noted that "SCCPCH" and "S-CCPCH" refer to the same channel.

FIG. 5 shows a frame diagram 500.

The frame diagram 500 includes a PICH frame 501 and a S-CCPCH frame 502 associated with the S-PICH frame 501.

A paging indicator set in the PICH frame 501 means that the paging message is transmitted on the PCH in the S-CCPCH frame starting $\tau_{PICH}$ 503 chips after the transmitted PICH frame 501. A typical value for $\tau_{PICH}$ 503 is 7680 chips (3 slots).

The Paging Block Periodicity (PBP) defines the period of the occurrence of Paging Blocks (for the FDD variant of UMTS the PBP=1). The Paging Occasion in UMTS is defined as follows:
FDD variant of UMTS: The System Frame Number (SFN) of the PICH frame where the UE monitors its paging indicator (i.e. the SFN of the PCCPCH frame in which the PICH frame begins).
TDD variant of UMTS: The paging block, which consists of several PICH frames. The value of Paging Occasion is equal to the first frame of the Paging Block.

The UTRA (i.e. UMTS) channel structure is described in the following.

Figure 6:
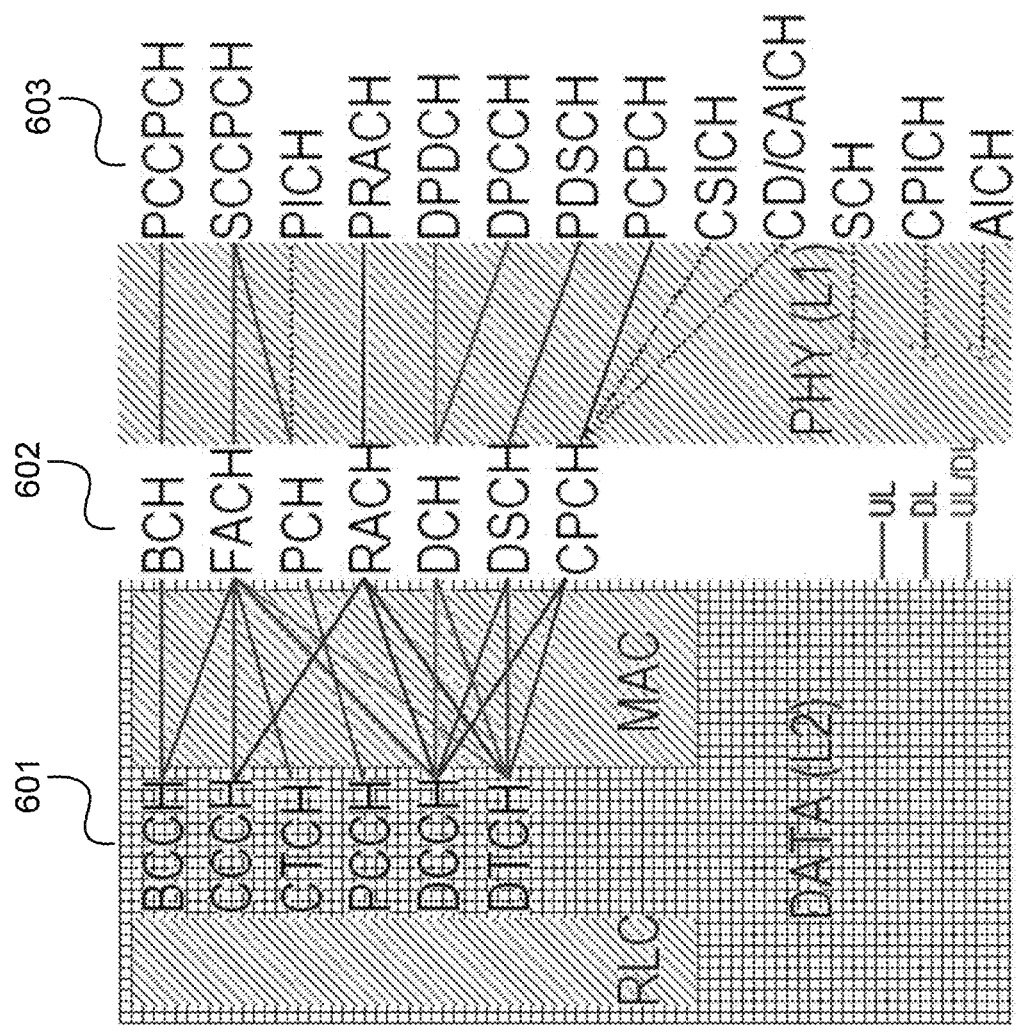
FIG. 6 illustrates the UMTS channel structure and channel mapping.

FIG. 6 illustrates the UMTS channel structure and channel mapping.

The UTRA FDD radio interface has logical channels 601, which are mapped to transport channels 602, which are again mapped to physical channels 603. Logical to Transport channel conversion happens in Medium Access Control (MAC) layer, which is a lower sub-layer of the Data Link Layer (Layer 2 according to the OSI/ISO reference model).

Logical Channels:
Broadcast Control Channel (BCCH), DL
Paging Control Channel (ITCH), DL
Dedicated Control Channel (DCCH), UL/DL
Common Control Channel (CCCH), UL/DL
Dedicated Traffic Channel (DTCH), UL/DL
Common Traffic Channel (CTCH), Unidirectional (one to many)

Transport Channels:
Dedicated Transport Channel (DCH), UL/DL, mapped to DCCH and DTCH
Broadcast Channel (BCH), DL, mapped to BCCH
Forward Access Channel (FACH), DL, mapped to BCCH, CCCH, CTCH, DCCH and DTCH
Paging Channel (PCH), DL, mapped to PCCH
Random Access Channel (RACH), UL, mapped to CCCH, DCCH and DTCH
Uplink Common Packet Channel (CPCH), UL, mapped to DCCH and DTCH
Downlink Shared Channel (DSCH), DL, mapped to DCCH and DTCH Physical Channels:
Primary Common Control Physical Channel (PCCPCH), mapped to BCH
Secondary Common Control Physical Channel (SC-CPCH), mapped to FACH, PCH
Physical Random Access Channel (PRACH), mapped to RACH
Dedicated Physical Data Channel (DPDCH), mapped to DCH
Dedicated Physical Control Channel (DPCCH), mapped to DCH
Physical Downlink Shared Channel (PDSCH), mapped to DSCH
Physical Common Packet Channel (PCPCH), mapped to CPCH
Synchronization Channel (SCH)
Common Pilot Channel (CPICH)
Acquisition Indicator Channel (AICH)
Paging Indication Channel (PICH)
CPCH Status Indication Channel (CSICH)
Collision Detection/Channel Assignment Indication Channel (CD/CA-ICH)

Paging Procedure in LTE

In earlier wireless communication systems such as UMTS as described above, a special Paging Indicator Channel is provided in the DL for a UE to detect paging messages. The Paging Indicator Channel was specifically designed to enable the UE to wake up its receiver periodically (for a very short period of time, in order to minimize the impact on battery life) for detecting a paging indicator (that is typically assigned to a group of UEs). The UE would then keep its receiver switched on to receive a longer message indicating the exact identity of the UE being paged.

In LTE there is no such separate physical channel for this purpose; instead the PDSCH is used for the paging message and the indication is provided via the PDCCH (Physical Downlink Control Channel). In LTE, the PDCCH signaling is already very short in duration, and therefore the impact on UE battery life of monitoring the PDCCH from time to time is low. Therefore the normal PDCCH signaling can be used to carry the (equivalent of a) paging indicator, while the detailed paging information is carried on the PDSCH in a resource block indicated by the PDCCH. Paging indicators sent on the PDCCH use a single fixed identifier called the P-RNTI (Paging Radio Network Temporary Identity). Rather than providing different paging identifiers for different (groups of) UEs, different (groups of) UEs are configured to monitor different sub-frames (paging occasions) for their paging messages.

The purpose of the paging procedure is one of the following:
- transmit paging information to a UE in RRC_IDLE, and/or
- inform UEs in RRC_IDLE and in RRC_CONNECTED about a SI (system information) change, and/or
- inform the UE about PWS (Public Warning System) notifications.

As an example, paging is initiated by the MME 109 when DL data intended for the UE 105, assumed to be in RRC_IDLE state, arrives at the S-GW 110.

Figure 7:
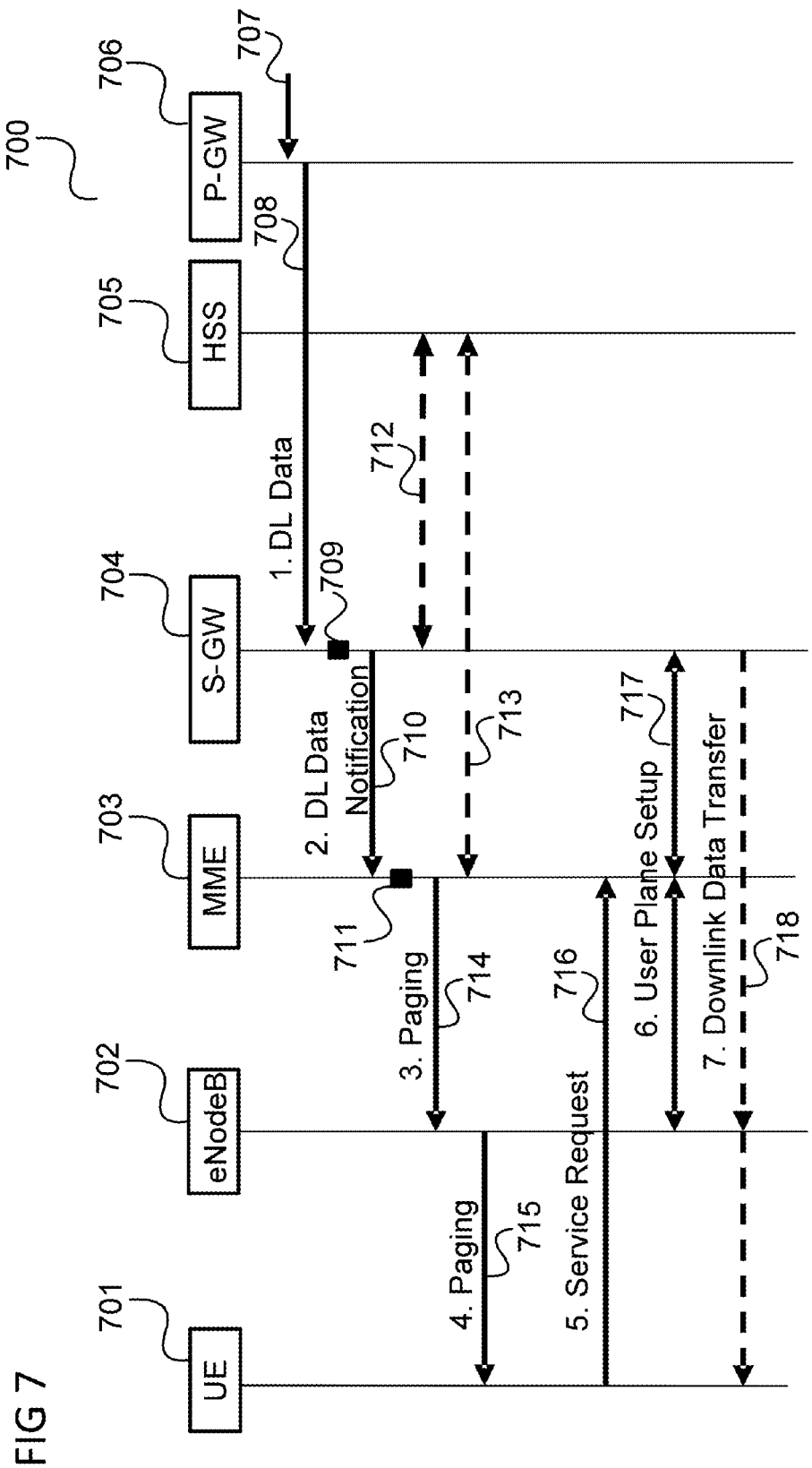
FIG. 7 shows a message flow diagram illustrating a paging procedure.

FIG. 7 shows a message flow diagram 700 illustrating a paging procedure.

The message flow takes place between a UE 701 corresponding to UE 105, a base station 702 corresponding to the base station 103 serving the UE 105, a MME 703 corresponding to MME 109, an S-GW 704 corresponding to S-GW 110 and a HSS 705 and a packet data gateway (P-GW) 706 which are for example part of the core network 102.

In 707, data to be transmitted to the UE 701 arrives at the P-GW 706.

The P-GW 706 forwards the data to the S-GW 704 in 708.

The S-GW 704 determines the right MME to be involved in the paging procedure in 709 and sends a DL data notification to the determined MME 703 in 710 notifying the MME 703 about the data to be transmitted to the UE 701.

In 711, the MME 703 determines the right nodes of the E-UTRAN 101 to contact, e.g. the right base station 103. The MME 703 is responsible for the Tracking Area List (TAL) management for UEs in RRC_IDLE and therefore knows which nodes of the E-UTRAN 101 (and which radio cells 104) are to be involved in the paging of the UE 701, It may be required for the S-GW 704 and/or the MME 703 to interrogate the HSS 705 in 712 and 713, respectively, for determining the right MME or the right nodes of the E-UTRAN 101. The HSS 705 is the master database for a given user containing the subscription-related information to support the network entities actually handling calls/sessions in order to acquire up-to-date information about the UE's whereabouts.

In 714, the MME 703 sends a paging request to those eNBs 103 that are relevant for the particular UE 701 according to the MM Context information (i.e. to all eNBs 103 operating radio cells 104 belonging to the Tracking Areas (TAs) in which the UE 701 is registered), in this case the base station 702 for example. The base station 702 may operate radio cells belonging to different TAs. The base station 702 transmits, in 715, to radio cells of the TA in question a paging message (i.e., the preceding Paging-Indicator on PDCCH followed by the actual RRC-Paging-Message on the PDSCH). The base station 701 transmits the paging message at the UE's paging occasion.

In 716, the UE 701 responds with a service request to the MME 703.

In 717, a user plane setup is performed and the data are transmitted to the UE 701 in 718.

The UE 105 may use Discontinuous Reception (DRX) in RRC_IDLE in order to reduce power consumption. Paging Occasions (PO) within a paging frame are illustrated in FIG. 8.

Figure 8:
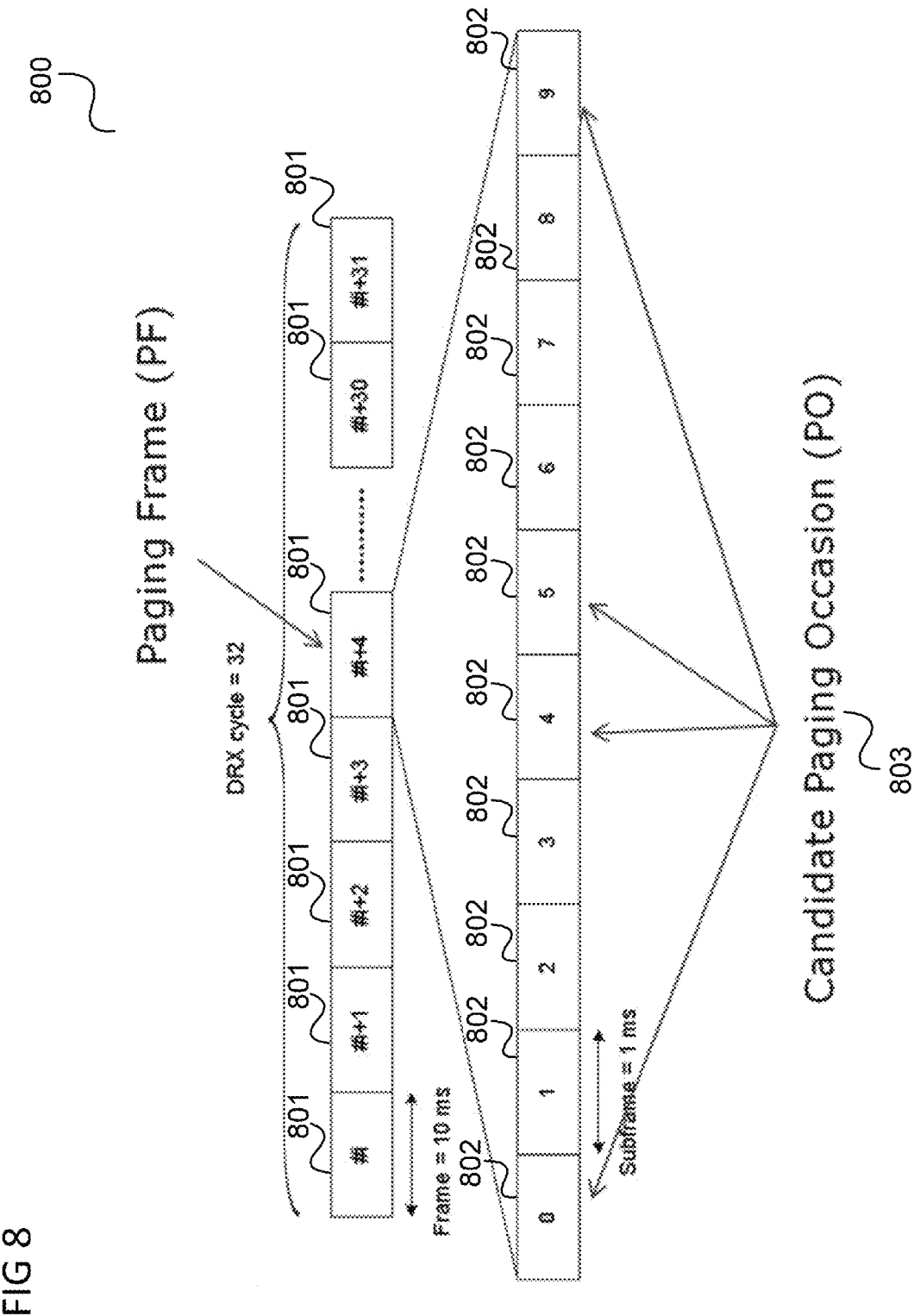
FIG. 8 shows a sequence of frames with paging opportunities.

FIG. 8 shows a sequence of paging frames 800.

The sequence of paging frames 800 includes paging frames 801 numbered from 0 to 31 according to the DRX cycle length of 32. Each paging frame includes ten sub-frames (numbered from 0 to 9) 802.

One Paging Occasion (PO) 803 is a sub-frame 802 where there may be the P-RNTI transmitted on PDCCH addressing the paging message. One Paging Frame (PF) 801 is one radio frame, which may contain one or multiple Paging Occasion(s) When DRX is used the UE 105 needs only to monitor one PO per DRX cycle.

PF and PO are determined by the following formulae using the DRX parameters provided in System Information.

PF is given by following equation:

$$SFN \bmod T = (T \operatorname{div} N)*(UE\_ID \bmod N)$$

The index i_s pointing to PO from sub-frame pattern is derived from following calculation:

$$i\_s = \operatorname{floor}(UE\_ID/N) \bmod Ns.$$

System Information DRX parameters stored in the UE 105 are updated locally in the UE 105 whenever the DRX parameter values are changed in SI. If the UE 105 has no IMSI, for instance when making an emergency call without USIM, the UE 105 uses as default identity UE_ID=0 in the PF and i_s formulas above.

The following parameters are used for the calculation of the PF and i_s:
- T: DRX cycle of the UE. T is determined by the shortest of the UE specific DRX value, if allocated by upper layers, and a default DRX value broadcast in system information. If UE specific DRX is not configured by upper layers, the default value is applied.
- nB: 4T, 2T, T, T/2, T/4, T/8, T/16, T/32.
- N: min(T,nB)
- Ns: max(1,nB/T)
- UE_ID: IMSI mod 1024.

The IMSI is given as sequence of digits of type Integer (0 . . . 9), the IMSI is in the formulae above interpreted as a decimal integer number, where the first digit given in the sequence represents the highest order digit. For example:
  IMSI=12 (digit1=1, digit2=2)
In the calculations, this is interpreted as the decimal integer "12", not "1×16+2=18".

An example configuration plus the resulting values for PF and PO are given in the following:
Example Configuration
  T (defaultPagingCycle)=32 subframes
  nB=4T
  UE_ID: IMSI mod 1024=1
  SFN=0 . . . 1023

Figure 9:
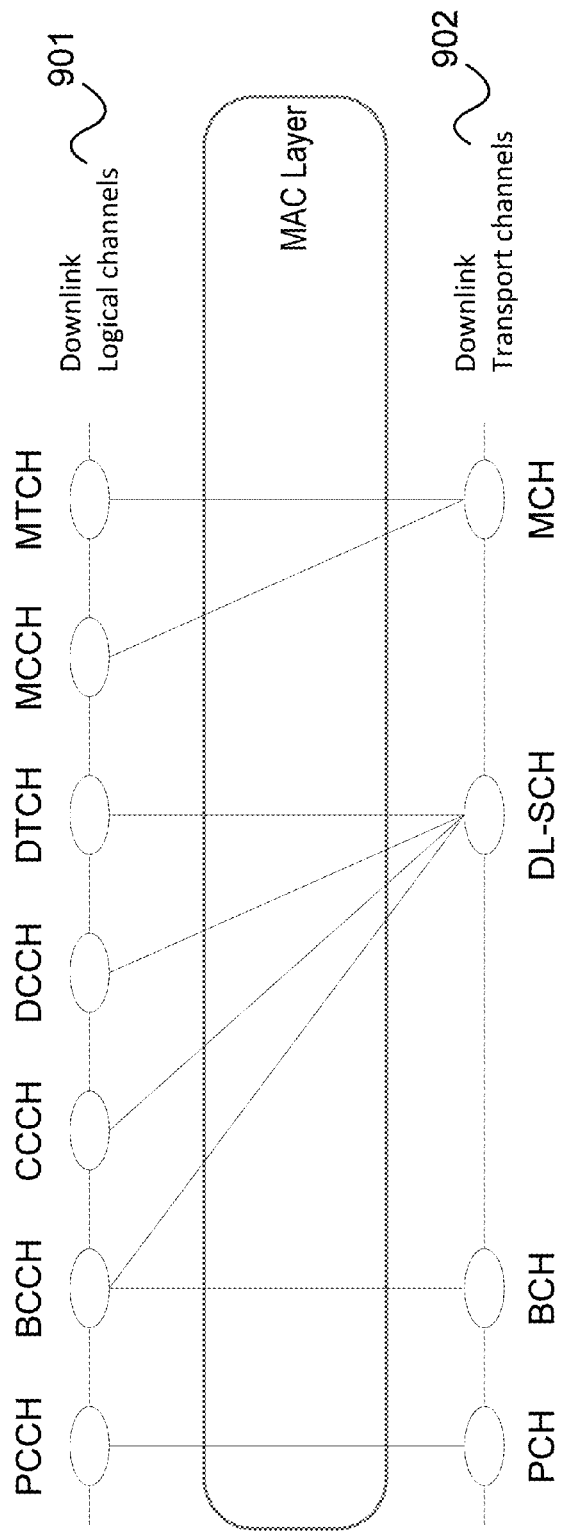
FIG. 9 illustrates the mapping between DL logical channels and DL transport channels in LTE.
Figure 10:
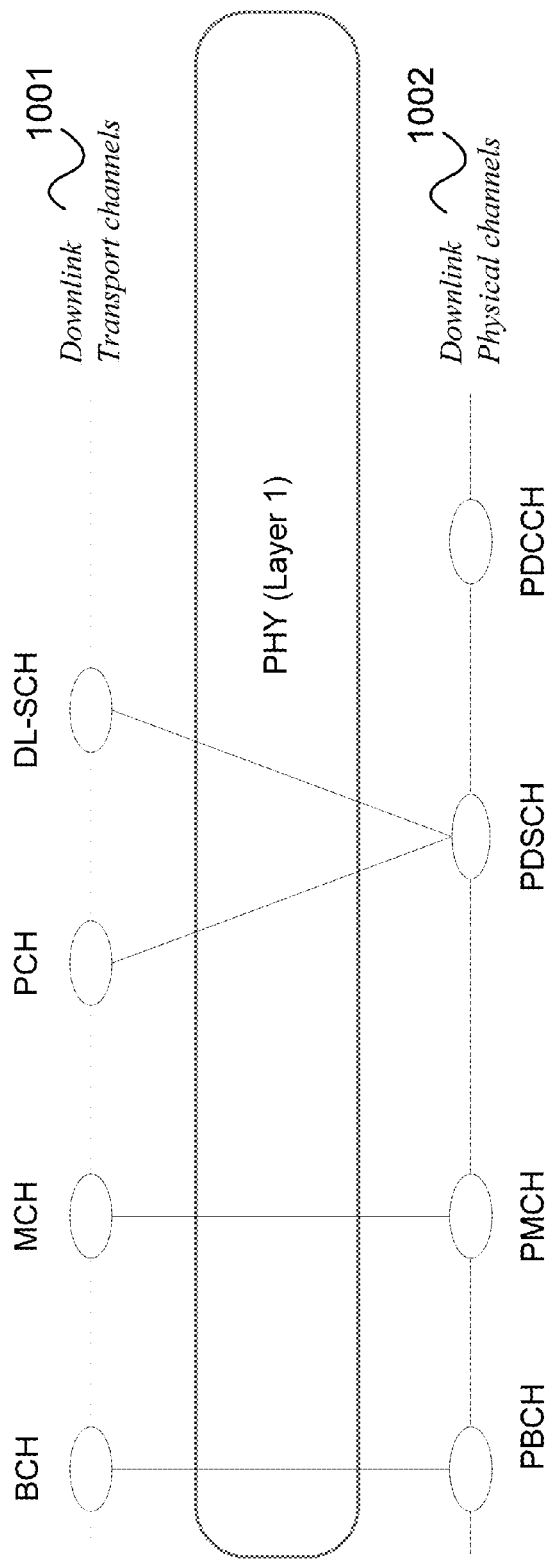
FIG. 10 illustrates the mapping between DL transport channels and DL physical channels in LTE.
Figure 11:
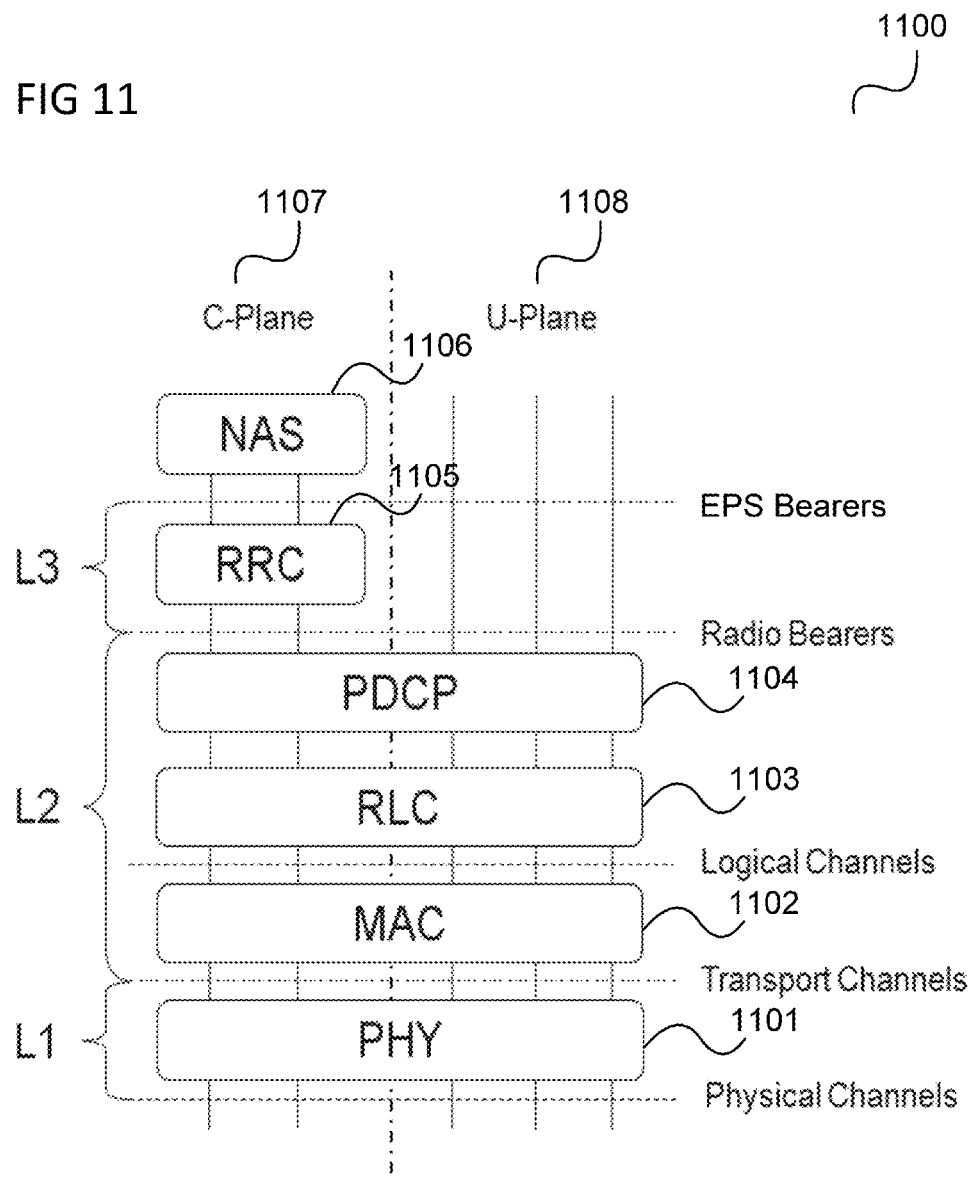
FIG. 11 shows a protocol structure.

Determination of Paging Frame (PF):
    N=min(T,nB)=32 subframes
    PF=SFN mod T=(T div N)*(UE_ID mod N)->SFN mod 32=1
    PF=1, 33, 65, ...
Determination of Paging Occasion (PO):
    Ns: max(1,nB/T)=4
    PO: i_s=floor(UE_ID/N)mod Ns=0
    In the following, further information about paging occasions and paging indicators in LTE is given:
Paging Occasions in LTE:
    Paging Occasions (PO) are evenly distributed in time.
    Not every radio frame must have a Paging Occasion.
    Length of a Paging Occasion is one subframe.
    The number of Paging Occasions is indicated as part of BCCH content transmitted on DL-SCH (SIB2).
    At every Paging Occasion UE wakes up and decodes PDCCH.
    The Paging Indicator (Paging-RNTI) can be found on the PDCCH.
Paging Indicator in LTE:
    UE is required to monitor PDCCH for Paging-RNTI (16 bits).
    Paging-RNTI is hard coded in UE (as "FFFE").
    Is transmitted on PDCCH with DCI formats 1A/1C.
    If the UE detects the Paging-RNTI on the PDCCH at its Paging Occasion, then the UE shall check the Paging-Message on PDSCH for its NAS identity.
    In the following, the LTE channel structure is described.
    When LTE was specified, one objective was to reduce the complexity of the channel mapping employed in UMTS. The channel mapping for LTE is illustrated in FIG. 9 and FIG. 10.
    FIG. 9 illustrates the mapping between DL logical channels 901 and DL transport channels 902 in LTE.
    FIG. 10 illustrates the mapping between DL transport channels 1001 and DL physical channels in LTE 1002.
    In Downlink, the following connections between logical channels and transport channels exist according to LTE:
    BCCH, mapped to BCH;
    BCCH, mapped to DL-SCH;
    PCCH, mapped to PCH;
    CCCH, mapped to DL-SCH;
    DCCH, mapped to DL-SCH;
    DTCH mapped to DL-SCH;
    MTCH, mapped to MCH;
    MCCH, mapped to MCH.
    The protocols for the C-Plane and the U-Plane of the E-UTRAN 101 according to LTE are illustrated in FIG. 11.
    FIG. 11 shows a protocol structure 1100.
    The LTE air interface (also referred to as Uu interface) is logically divided into three protocol layers. The entities ensuring and providing the functionality of the respective protocol layers are implemented both in the mobile terminal 105 and the base station 103 or (in case of NAS, in the mobile terminal 105 and the MME 109). The bottommost layer is the physical layer (PHY) 1101, which represents the protocol layer 1 (L1) according to the OSI (Open System Interconnection) reference model. The protocol layer arranged above PHY is the data link layer, which represents the protocol layer 2 (L2) according to the OSI reference model. In an LTE communication system, L2 consists of plurality of sublayers, namely the Medium Access Control (MAC) sublayer 1102, the Radio Link Control (RLC) sublayer 1103 and the Packet Data Convergence Protocol (PDCP) sublayer 1104. The topmost layer of the Uu air interface is the network layer, which is the protocol layer 3 (L3) according to the OSI reference model and consists of the Radio Resource Control (RRC) layer 1105 on the C-Plane 1107. On the C-Plane 1107, there is further the NAS (Non-Access Stratum) protocol layer 1106.

Each protocol layer 1101 to 1106 provides the protocol layer above it with its services via defined service access points (SAPs). To provide a better understanding of the protocol layer architecture, the SAPs were assigned unambiguous names: The PHY 1101 provides its services to the MAC layer 1102 via transport channels, the MAC layer 1102 provides its services to the RLC layer 1103 via logical channels, and the RLC layer 1103 provides its services to the PDCP layer 1104 as data transfer as function of the RLC mode, i.e. TM (Transparent Mode), UM (Unacknowledged Mode) and AM (Acknowledged Mode). Further, the PDCP layer 1104 provides its services to the RRC layer 1105 and the U-Plane 1108 upper layers via radio bearers, specifically as Signaling Radio Bearers (SRB) to the RRC 1105 and as Data Radio Bearers (DRB) to the U-Plane 1108 upper layers. According to LTE a maximum of 3 SRBs and 11 DRBs is currently supported.

The radio protocol architecture is not just split horizontally into the above-described protocol layers; it is also split vertically into the "control plane" (C-Plane) 1107 and the "user plane" (U-Plane) 1108. The entities of the control plane 1107 are used to handle the exchange of signaling data between the mobile terminal 105 and the base station 103 or core network 109, which are required among other for the establishment, reconfiguration and release of physical channels, transport channels, logical channels, signaling radio bearers and data radio bearers, whereas the entities of the user plane 1108 are used to handle the exchange of user data between the mobile terminal 105 and the base station 103.

Figure 12:
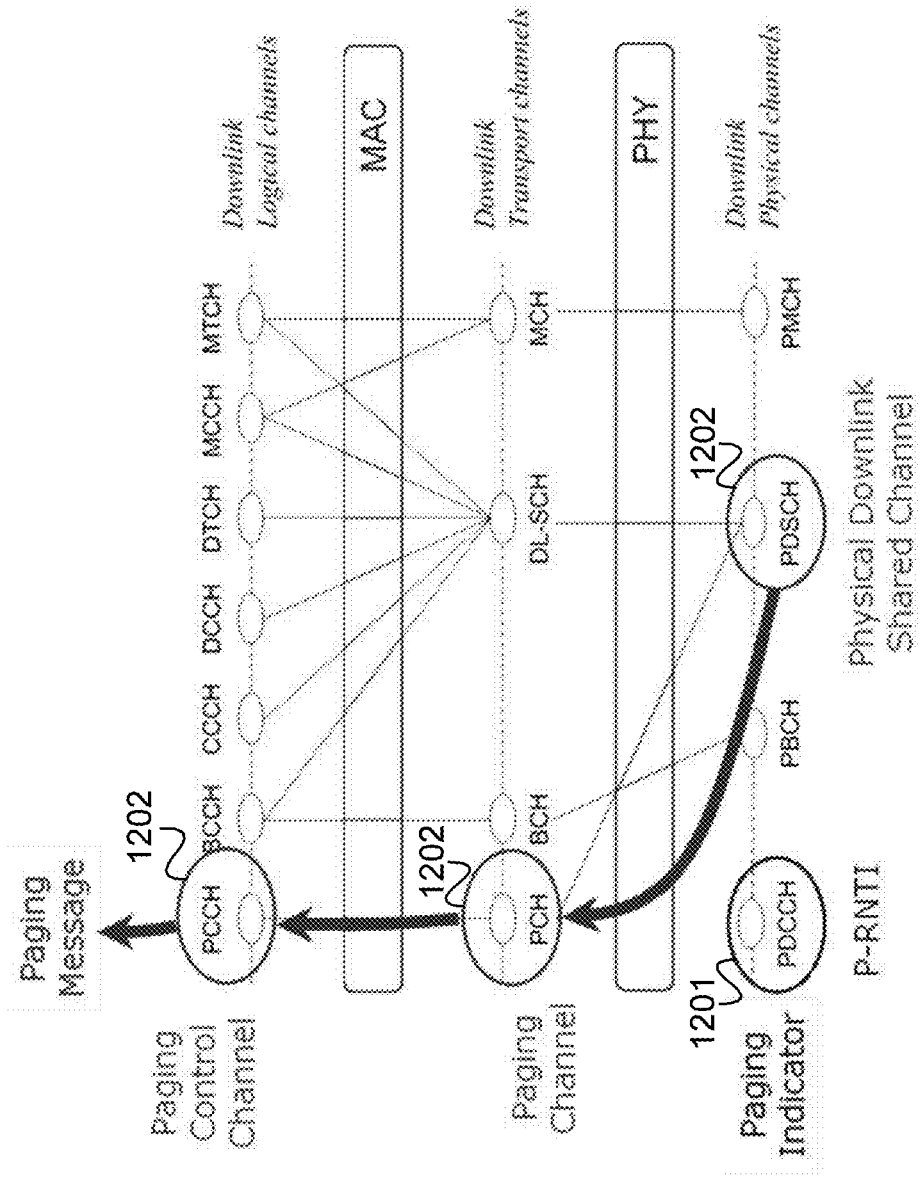
FIG. 12 illustrates the LTE paging procedure on the UE side.

FIG. 12 illustrates the LTE paging procedure on the UE side.

First, the UE 105 is required to monitor the PDCCH (Physical Downlink Control Channel) for the Paging-RNTI 1201. If the UE 105 detects the Paging-RNTI 1201 on the PDCCH at its (individual) Paging Occasion(s), then the UE 105 checks the Paging-Message 1202 received via PDSCH (Physical Downlink Shared Channel)/PCH (Paging Channel)/PCCH (Paging Control Channel) for its NAS identity (either S-TMS™ or IMSI). In addition to the UE's NAS identity, the Paging-Message 1202 may contain further details about the reason for paging, such as "System Information Modification" or "PWS Indication". In fact, instead of a general PWS Indication detailed indicators may be provided for different flavors of PWS, such as ETWS (Earthquake and Tsunami Warning service), CMAS (Commercial Mobile Telephone Alert), KPAS (Korean Public Alert System), or EU-Alert.

Paging can be regarded as an important feature in wireless communication systems. For example, in UMTS and LTE it is used to Wake-up a particular UE residing in RRC_IDLE when incoming calls or an event of "downlink data arrival" for the UE are detected in the CN (i.e., initiate the RRC connection set-up procedure).

Inform UEs residing in RRC_IDLE and RRC_CONNECTED about System Information changes. System Information is disseminated in broadcast mode and provides vital parameters for all UEs in coverage to make the wireless communication system work.

Trigger fast acquisition of time-critical PWS (Public Warning System) messages by UEs residing in RRC_IDLE and RRC_CONNECTED in order to fulfill regulatory requirements.

Successful paging requires both accurate configuration of paging parameters and consistent UE behavior during the entire Paging-Message acquisition procedure. Many things can go wrong. For example, a UE might be provided with the wrong parameters during configuration and look out for the Paging-Message at the wrong paging occasions.

A communication device and a mobile terminal (and corresponding methods) are provided which enable performance measurements of the paging procedure and to detect a faulty paging configuration. For example, the paging performance measurements are configured by an entity of the core network of a communication system, performed by the mobile terminal (e.g. a UE), and reported back to the (or another) core network entity, e.g. in the scope of MDT. MDT enhancements may accordingly be used as core building blocks to implement the above.

Figure 13:
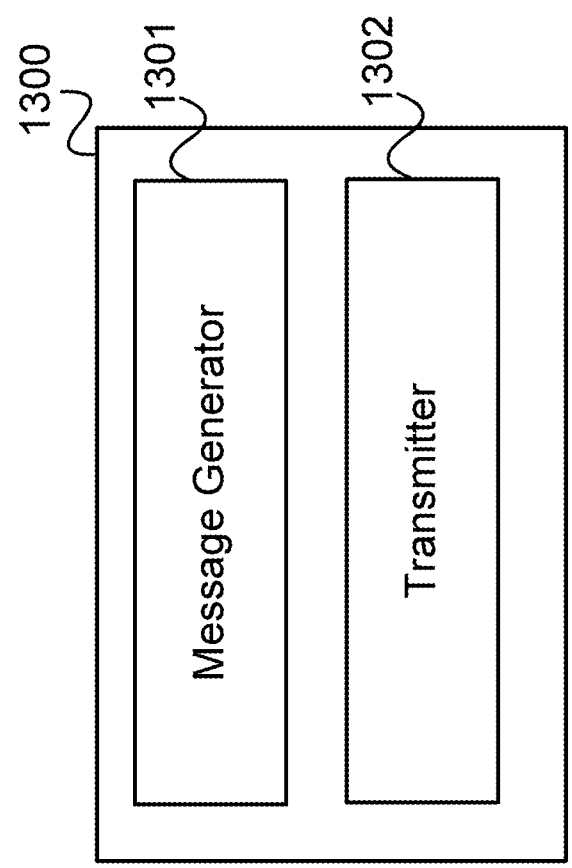
FIG. 13 shows a communication device.

FIG. 13 shows a communication device 1300.

The communication device 1300 includes a message generator 1301 configured to generate a message indicating that a mobile terminal should provide data from which information about the configuration of the mobile terminal for the reception of paging messages is derivable.

The communication device further includes a transmitter 302 configured to transmit the message.

In general, the message may include instructions for the mobile terminal to provide data from which information about the behavior of the mobile terminal in the event of paging is derivable. Said data may include the results of calculations performed in the mobile terminal (e.g., for determining paging frames and/or paging occasions) in preparation for executing the paging message acquisition procedure.

In other words, a communication device is for example provided that requests a mobile terminal (in other words a mobile communication terminal) to provide data related to its paging configuration, e.g. about configuration parameters that are specific for the reception of paging messages (rather than the reception of other messages). These data may include explicit information about the configuration (such as parameter values which have been indicated to the mobile terminal or which have been derived from parameter values indicated to the mobile terminal), i.e. from which information about the configuration of the mobile terminal is directly derivable, or may be data from which information about the configuration of the mobile terminal is indirectly derivable (i.e. from which conclusions about the configuration may be drawn), e.g. from which it can be seen whether the configuration of the mobile terminal with respect to paging is correct, e.g. content of a paging message received by the mobile terminal such that it can be seen whether the mobile terminal has received the correct paging content.

The transmitter is for example configured to transmit the message to the mobile terminal.

The message may indicate to the mobile terminal that the mobile terminal should provide data from which information about the configuration of the mobile terminal for the reception of paging messages is derivable.

The message for example indicates that the mobile terminal should provide data including information about the behavior of the mobile terminal in the event of paging.

The message may indicate that the mobile terminal should provide data from which the configuration of the mobile terminal for the reception of paging messages is derivable.

The message may for example indicate that the mobile terminal should provide data from which it is derivable whether the configuration of the mobile terminal for the reception of paging messages is correct.

For example, the message indicates that the mobile terminal should provide information from which it is derivable whether the paging message reception process performed by the mobile terminal was erroneous.

For example, the message indicates that the mobile terminal should provide information from which it is derivable which part (or which parts) of the paging message reception process performed by the mobile terminal was (or were) erroneous.

The message may indicate that the mobile terminal should provide the value of a paging parameter used by the mobile terminal to receive paging messages.

For example, the paging parameter is a timing parameter used by the mobile terminal to receive paging messages.

The paging parameter is for example a frame number or a subframe number used by the mobile terminal to receive paging messages.

The message may for example indicate that the mobile terminal should provide at least a part of the content of a received paging message.

The message for example indicates that the mobile terminal should provide at least one of a paging parameter used by the mobile terminal to receive paging messages and at least a part of the content of a received paging message.

The communication device is for example a base station.

The communication device is for example part of a communication network and the message for example indicates that the mobile terminal should provide data from which it is derivable whether the mobile terminal is correctly configured to receive paging messages from the communication network.

The message generator is for example configured to generate the message in accordance with MDT (Minimization of Drive Tests) and the transmitter is for example configured to transmit the message in accordance with MDT.

For example, the communication device is part of the network side of a wireless communication system and the transmitter is configured to transmit the message to another communication device of the network side of the wireless communication system. For example, the message is generated and transmitted by a TCE or an EM to another component of the network side such as a base station for forwarding to the mobile terminal.

Figure 14:
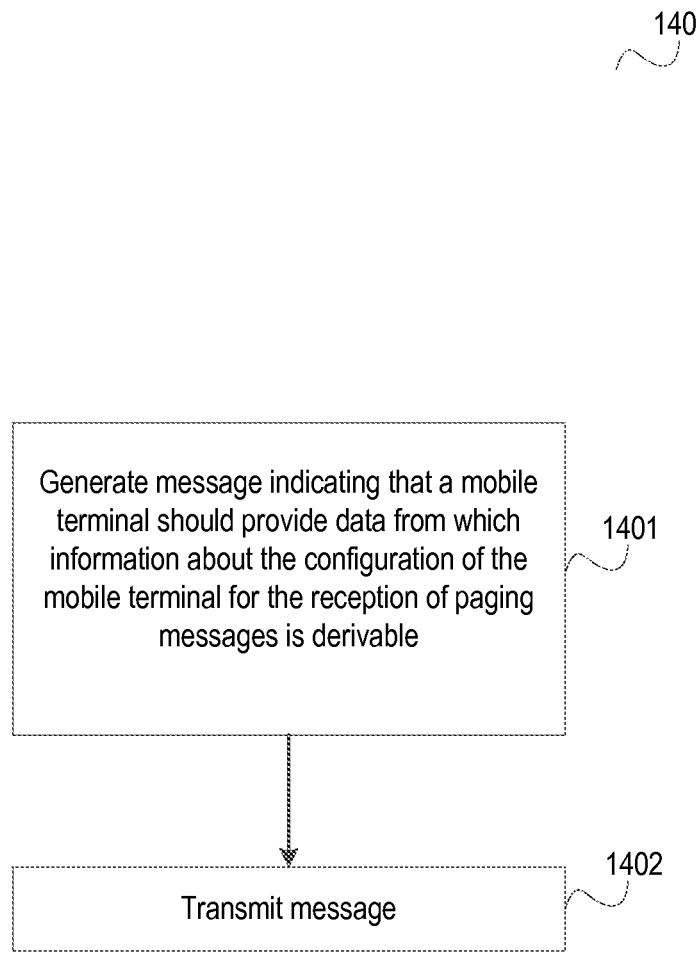
FIG. 14 shows a flow diagram illustrating a method for requesting information.

The communication device for example carries out a method as illustrated in FIG. 14.

FIG. 14 shows a flow diagram 1400.

The flow diagram 1400 illustrates a method for requesting information and is for example carried out by a communication device.

In 1401, the communication device generates a message indicating that a mobile terminal should provide data from which information about the configuration of the mobile terminal for the reception of paging messages is derivable.

In 1402, the communication device transmits the message.

Figure 15:
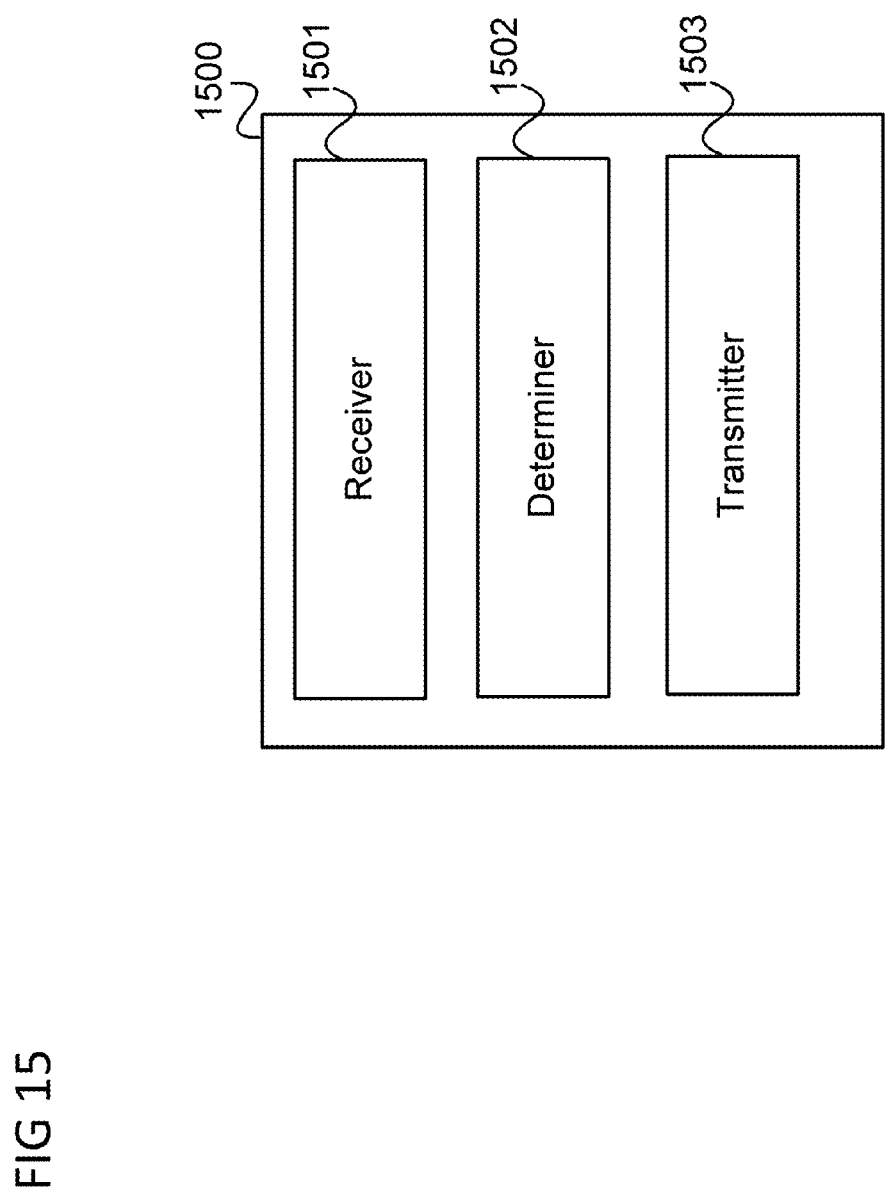
FIG. 15 shows a mobile terminal.

The message is for example transmitted to the mobile terminal, e.g. to a mobile terminal as illustrated in FIG. 15.

FIG. 15 shows a mobile terminal 1500.

The mobile terminal 1500 includes a receiver 1501 configured to receive a message indicating to the mobile terminal 1500 that the mobile terminal 1500 should provide data from which information about the configuration of the mobile terminal 1500 for the reception of paging messages is derivable.

The mobile terminal 1500 further includes a determiner 1502 configured to determine data from which information about the configuration of the mobile terminal 1500 for the reception of paging messages is derivable.

Further, the mobile terminal 1500 includes a transmitter 1503 configured to transmit the data to a communication device.

For example, the receiver 1501 is configured to receive the message from the communication device.

Figure 16:
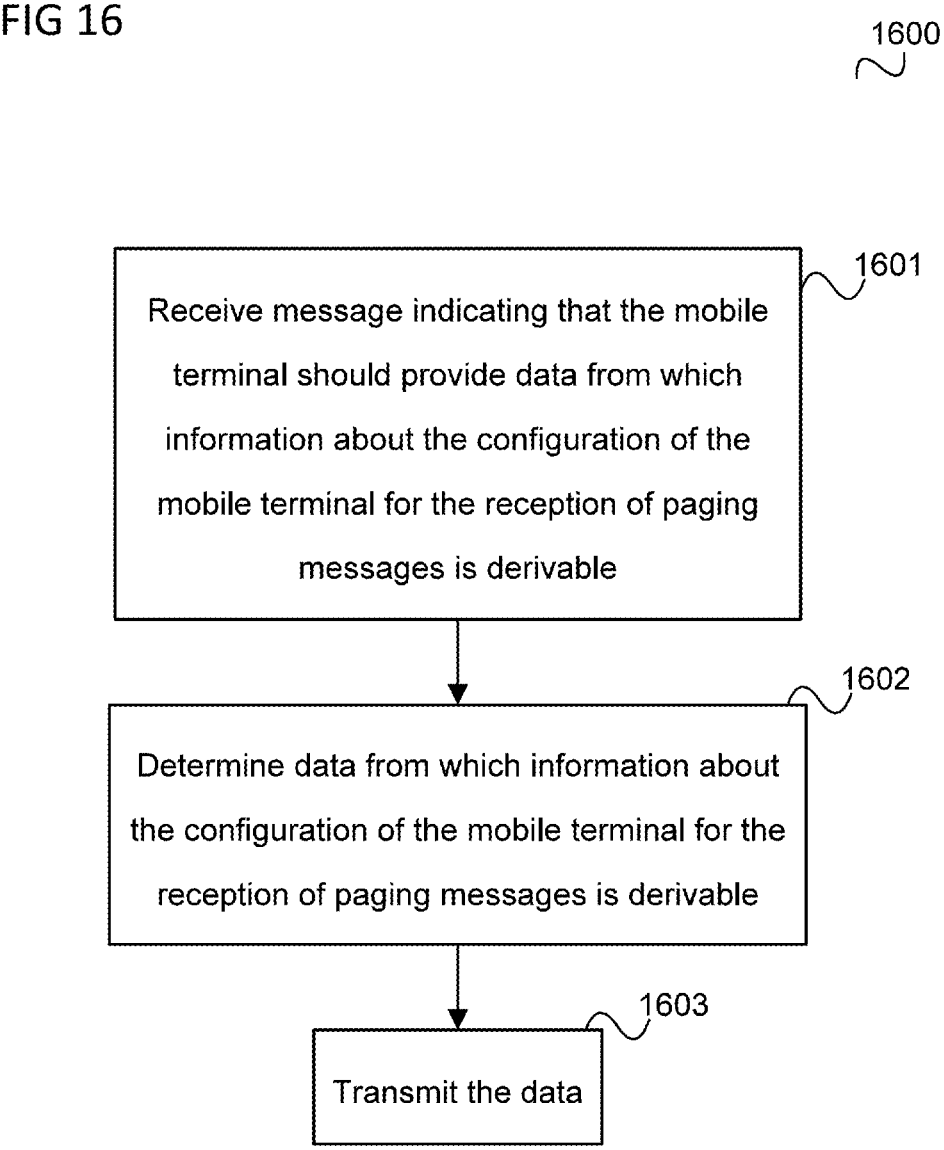
FIG. 16 shows a flow diagram illustrating a method for providing information.

The mobile terminal 1500 for example carries out a method as illustrated in FIG. 16.

FIG. 16 shows a flow diagram 1600.

The flow diagram 1600 illustrates a method for providing information, for example carried out by a mobile terminal.

In 1601, the mobile terminal receives a message indicating to the mobile terminal that the mobile terminal should provide data from which information about the configuration of the mobile terminal for the reception of paging messages is derivable.

In 1602, the mobile terminal determines data from which information about the configuration of the mobile terminal for the reception of paging messages is derivable.

In 1603, the mobile terminal transmits the data to a communication device.

The message is for example received from the communication device.

The components of the communication device and/or the mobile terminal (e.g. the message generator, the transmitter, the receiver, the determiner etc.) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

It should be noted that aspects regarding implementation of components described in context with the communication device 1300 and the method illustrated in FIG. 14 are analogously valid for the mobile terminal 1500 and the method illustrated in FIG. 16 and vice versa.

In the following examples for the communication device 1300, the mobile terminal 1500 and the corresponding methods are described in more detail. In the following examples, the Trace-based MDT approach as described with reference to FIG. 3 is used.

In one example, one or more parameters for paging performance measurements are included in the MDT Configuration (which is first sent from EM 301 to the base station 304 eNB and then from the base station 304 to the mobile terminal (UE) 305). These parameters may be seen as a request for the UE 305 to provide data from which information about its paging configuration is derivable (e.g. whether the paging configuration is correct) or, generally speaking, from which information about its behavior in the event of paging is derivable.

For example, in the MDT configuration (at least) one parameter is added to turn on/off the a paging performance measurement function of the mobile terminal 305, to control the details of such paging performance measurements, or generally the determination and provision of information about the paging configuration by the mobile terminal 305. The parameter(s) may be used to indicate to the UE 305 that the EM 301 is interested in details about the paging procedure (or certain parts thereof, for example, only the Paging Indicator (PI) or only the Paging-Message reception) as it is carried out by the UE 305.

On the terminal (i.e. UE 305) side, one or more parameters for the inclusion of paging performance measurement results may be added to an MDT Report which is first sent from UE 305 to the base station 304 in 319 and then from the base station 304 to the EM 301 in 321 in response to the MDT configuration transmitted to the UE 305 which includes the results of the MDT measurements performed in 318.

For example, in a trace-based MDT report (at least) one new parameter is added for the paging performance measurement results. In UMTS and LTE, the following paging-related information (in addition to location stamps and time stamps) may for example be added to the MDT report, or generally to a response to the request for information about the paging configuration of the mobile terminal:

PICH frame to S-CCPCH frame association offsets (UMTS only);
DCI format used on PDCCH (LTE only);
DRX related information
  a. configuration settings in UE;
  b. DRX status at the time of paging;
PF and/or PO related information
  a. input parameters for PF/PO calculation used by the UE;
  b. PF/PO values applied in the UE (i.e., calculation results);
contents of the LTE Paging-Message
  a. number of Paging Records in Paging-Message,
  b. UE identity used by the network to address the receiving UE,
  c. CN Domain indicator
  d. paging cause Most of these examples of paging related information are applicable to both UMTS as well as to LTE, but some only make sense for either UMTS or LTE. It should be noted that the described approaches may be analogously applied to other mobile communication standards according to which paging is provided.

For example, paging performance measurements in a wireless communications system are supported such that the MNO (mobile network operator) is enabled to obtain detailed knowledge about, for example, Paging Indicator (PI) reception by the mobile terminal;
Paging-Message reception by the mobile terminal;
mobile terminal configuration details for paging e.g. including details for PF and PO calculation;
DRX status in the mobile terminal;
content of a paging message received by the mobile terminal.

With this knowledge the MNO may detect reasons for a paging failure. The measurements received as part of the MDT results can be used to fine tune the paging procedure and improve the wireless communications system overall service behavior.

It should be noted that the term "paging performance measurement" may be generally understood to include any determination of data from which information about the paging configuration (and thus of its performance, e.g. in terms of whether it is correct) of a mobile terminal is derivable.

For example, an EM (Element Manager) triggers paging performance measurements in the scope of MDT by letting a UE record what configuration settings it uses (or has used) for the calculation of PI and PO as well as the calculation results plus some auxiliary data, for instance pertaining to DRX settings at the time of paging or contents of the paging message, such as the paging cause.

In the following, examples for one or more parameters which are included into the MDT configuration as it is exchanged on the network side (i.e. in 307, 309 and 311 in FIG. 3) are described in more detail.

According to the following examples, in the trace-based MDT configuration at least one parameter is used to control paging performance measurements to be carried out in the UE 305. In the following example, the trace session activation message sequence as described with reference to FIG. 3 is used for communicating this parameter to the UE 305. The at least one parameter is included (added) to the messages transmitted in 307, 309 and 311. Thus, the MDT configuration for paging performance measurements is propagated from the EM (Element Manager) 301 to the base station 304 in 307, 309 and 311. For 311 (between MME 303 and base station 304) the S1AP (S1 Application Protocol) may be modified in order to convey the MDT Configuration including the at least one parameter controlling the paging performance measurements (also referred to as paging measurement parameter in the following).

In 307, 309 and 311, the MDT Configuration IE (information element) may be used to transmit the MDT configuration details from the EM 301 to the base station 304.

In the following three examples (alternatives) for possible modification of MDT Configuration IE are given to transmit one or more paging measurement parameters from the EM 301 to the base station 304. It should be noted that a combination of the three alternatives given in the following may be used.

Network-Side Paging Measurement Parameter Exchange Example #1

In this example, only one parameter is used to turn paging performance measurements on and off. This example may for example be used for Immediate MDT.

In this example, a measurement denoted as Mx is defined for paging performance measurements. This is in this example done in analogy to the other measurements such as M1 and M2 which are provided in MDT for LTE, e.g. as follows:

Measurements (for LTE for Immediate-MDT):
    M1: RSRP and RSRQ measurement by UE.
    M2: Power Headroom (PH) measurement by UE.
    . . .
    Mx: Paging Performance Measurements by UE For a UE in RRC_CONNECTED the Mx measurement can be used to turn on/off paging performance measurements independently from (and in addition to) the other measurements M1 and M2 by setting a corresponding bit in the MDT configuration accordingly.

For example, the MDT configuration has the structure as shown in table 1 wherein Bit X=Mx in the 13$^{th}$ line of table 1 has been added to activate or deactivate the paging performance measurements.

TABLE 1

| | The IE defines the MDT configuration parameters. IE/Group Name | Presence | Range | IE type and reference | Semantics description |
|---|---|---|---|---|---|
| 1 | | | | | |
| 2 | MDT Activation | M | | ENUMERATED (Immediate MDT only, Logged MDT only, Immediate MDT and Trace, . . . ) | |
| 3 | CHOICE Area Scope of MDT | M | | | |
| 4 | >Cell based | | | | |
| 5 | >>Cell ID List for MDT | | 1 to <maxnoof CellIDfor MDT> | | |
| 6 | >>>E-CGI | M | | 9.2.1.38 | |
| 7 | >TA based | | | | |
| 8 | >>TA List for MDT | | 1 to <maxnoof TAforMDT> | | |
| 9 | >>>TAC | M | | 9.2.3.7 | |
| 10 | >PLMN Wide | | | NULL | |
| 11 | CHOICE MDT Mode | M | | | |
| 12 | >Immediate MDT | | | | |
| 13 | >>Measurements to Activate | M | | BITSTRING (SIZE(8)) | Each position in the bitmap indicates a MDT measurement as defined according to 3GPP.]. First Bit = M1, Second Bit = M2. Bit X = Mx Other bits are reserved for future use and are ignored if received. Value "1" indicates "activate" and value "0" indicates "do not activate". |

TABLE 1-continued

| 1 | The IE defines the MDT configuration parameters. IE/Group Name | Presence | Range | IE type and reference | Semantics description |
|---|---|---|---|---|---|
| 14 | >>Reporting Trigger MDT | M | | ENUMERATED (periodic, A2event-triggered,, . . . ) | |
| 15 | >>Threshold Event A2 | C-if M1 A2 trigger | | | Included in case of event-triggered reporting for measurement M1 |
| 16 | >>>CHOICE Threshold | M | | | |
| 17 | >>>>RSRP | | | | |
| 18 | >>>>>Threshold RSRP | M | | INTEGER (0 . . . 97) | As defined according to 3GPP. |
| 19 | >>>>RSRQ | | | | |
| 20 | >>>>>Threshold RSRQ | M | | INTEGER (0 . . . 34) | As defined according to 3GPP. |
| 21 | >>Periodic reporting MDT | C-ifperiodic MDT | | | Included in case of periodic reporting. |
| 22 | >>>Report interval | M | | ENUMERATED (ms120, ms240, ms480, ms640, ms1024, ms2048, ms5120, ms10240,, min1, min6, min12, min30, min60) | As defined according to 3GPP. |
| 23 | >>>Report amount | M | | ENUMERATED (1, 2, 4, 8, 16, 32, 64, infinity) | Number of reports. |
| 24 | >Logged MDT | | | | |
| 25 | >>Logging interval | M | | ENUMERATED (1.28, 2, 56, 5.12, 10.24, 20.48, 30.72, 40.96 and 61.44) | As defined according to 3GPP. Unit: [second] |
| 26 | >>Logging duration | M | | ENUMERATED (10, 20, 40, 60, 90 and 120) | As defined according to 3GPP. Unit: [minute] |

Network-Side Paging Measurement Parameter Exchange Example #2

This example may for example be used for Logged MDT. In this example an information element is defined for paging performance measurements that may be optional and can be used to turn on/off the paging performance measurements performed by the UE 305 in RRC_IDLE mode.

For example, the MDT configuration has the structure as shown in table 2 wherein the information element PPM in the last line has been added to activate or deactivate the paging performance measurements.

TABLE 2

| The IE defines the MDT configuration parameters. IE/Group Name | Presence | Range | IE type and reference | Semantics description |
|---|---|---|---|---|
| MDT Activation | M | | ENUMERATED (Immediate MDT only, Logged MDT only, Immediate MDT and Trace, . . . ) | |
| CHOICE Area Scope of MDT | M | | | |
| >Cell based | | | | |
| >>Cell ID List for MDT | | 1 to <maxno ofCellID forMDT> | | |
| >>>E-CGI | M | | 9.2.1.38 | |
| >TA based | | | | |

TABLE 2-continued

The IE defines the MDT configuration parameters.

| IE/Group Name | Presence | Range | IE type and reference | Semantics description |
|---|---|---|---|---|
| >>TA List for MDT | | 1 to <maxnoofTAforMDT> | | |
| >>>TAC | M | | 9.2.3.7 | |
| >PLMN Wide CHOICE MDT Mode | M | | NULL | |
| >Immediate MDT | | | | |
| >>Measurements to Activate | M | | BITSTRING (SIZE(8)) | Each position in the bitmap indicates a MDT measurement as defined according to 3GPP. First Bit = M1, Second Bit = M2. Other bits are reserved for future use and are ignored if received. Value "1" indicates "activate" and value "0" indicates "do not activate". |
| >>Reporting Trigger MDT | M | | ENUMERATED (periodic, A2event-triggered,, . . . ) | |
| >>Threshold Event A2 | C-ifM1A2trigger | | | Included in case of event-triggered reporting for measurement M1 |
| >>>CHOICE Threshold | M | | | |
| >>>>RSRP | | | | |
| >>>>>Treshold RSRP | M | | INTEGER (0 . . . 97) | As defined according to 3GPP. |
| >>>>RSRQ | | | | |
| >>>>>Threshold RSRQ | M | | INTEGER (0 . . . 34) | As defined according to 3GPP. |
| >>Periodic reporting MDT | C-ifperiodicMDT | | | Included in case of periodic reporting. |
| >>>Report interval | M | | ENUMERATED (ms120, ms240, ms480, ms640, ms1024, ms2048, ms5120, ms10240,, min1, min6, min12, min30, min60) | As defined according to 3GPP. |
| >>>Report amount | M | | ENUMERATED (1, 2, 4, 8, 16, 32, 64, infinity) | Number of reports. |
| >Logged MDT | | | | |
| >>Logging interval | M | | ENUMERATED (1.28, 2, 56, 5.12, 10.24, 20.48, 30.72, 40.96 and 61.44) | As defined according to 3GPP. Unit: [second] |
| >>Logging duration | M | | ENUMERATED (10, 20, 40, 60, 90 and 120) | As defined according to 3GPP. Unit: [minute] |
| >>PPM | O | | Boolean (true, false) | Used to turn "Paging Performance Measurements" on and off. Value "1" indicates "activate" and value "0" indicates "do not activate". |

In the above two examples, details of the paging performance measurements may be pre-defined, e.g. what information the UE determines, which thresholds the UE applies, what reporting triggers are used etc.

Network-Side Paging Measurement Parameter Exchange Example #3

In this example, as paging performance measurements may be relevant for UEs in both modes of operation, namely in RRC_IDLE and in RRC_CONNECTED, a generic IE for use in the MDT Configuration IE is defined which may be used for both Immediate-MDT and Logged-MDT.

In this example, a number of parameters for a paging performance measurement are given in the MDT configuration to allow more flexibility.

For example, the MDT configuration has the structure as shown in table 3 wherein the information elements in the last 15 lines have been added for paging performance measurement parameters.

TABLE 3

|  | The IE defines the MDT configuration parameters. IE/Group Name | Presence | Range | IE type and reference | Semantics description |
|---|---|---|---|---|---|
| 2 | MDT Activation | M |  | ENUMERATED (Immediate MDT only, Logged MDT only, Immediate MDT and Trace, . . . ) |  |
| 3 | CHOICE Area Scope of MDT | M |  |  |  |
| 4 | >Cell based |  |  |  |  |
| 5 | >>Cell ID List for MDT |  | 1 to <maxno ofCellIDfor MDT> |  |  |
| 6 | >>>E-CGI | M |  | 9.2.1.38 |  |
| 7 | >TA based |  |  |  |  |
| 8 | >>TA List for MDT |  | 1 to <maxno ofTAfor MDT> |  |  |
| 9 | >>>TAC | M |  | 9.2.3.7 |  |
| 10 | >PLMN Wide |  |  | NULL |  |
| 11 | CHOICE MDT Mode | M |  |  |  |
| 12 | >Immediate MDT |  |  |  |  |
| 13 | >>Measurements to Activate | M |  | BITSTRING (SIZE(8)) | Each position in the bitmap indicates a MDT measurement, as defined 3GPP. First Bit = M1, Second Bit = M2. Other bits are reserved for future use and are ignored if received. Value "1" indicates "activate" and value "0" indicates "do not activate". |
| 14 | >>Reporting Trigger MDT | M |  | ENUMERATED (periodic, A2event-triggered,, . . . ) |  |
| 15 | >>Threshold Event A2 | C-ifM1A2trigger |  |  | Included in case of event-triggered reporting for measurement M1 |
| 16 | >>>CHOICE Threshold | M |  |  |  |
| 17 | >>>>RSRP |  |  |  |  |
| 18 | >>>>>Threshold RSRP | M |  | INTEGER (0 . . . 97) | This IE is defined 3GPP |
| 19 | >>>>RSRQ |  |  |  |  |
| 20 | >>>>>Threshold RSRQ | M |  | INTEGER (0 . . . 34) | This IE is defined in 3GPP |

TABLE 3-continued

The IE defines the MDT configuration parameters.

| 1 | IE/Group Name | Presence | Range | IE type and reference | Semantics description |
|---|---|---|---|---|---|
| 21 | >>Periodic reporting MDT | C-ifperiodicMDT | | | Included in case of periodic reporting. |
| 22 | >>>Report interval | M | | ENUMERATED (ms120, ms240, ms480, ms640, ms1024, ms2048, ms5120, ms10240, min1, min6, min12, min30, min60) | This IE is defined in 3GPP |
| 23 | >>>Report amount | M | | ENUMERATED (1, 2, 4, 8, 16, 32, 64, infinity) | Number of reports. |
| 24 | | | | | |
| 25 | >Logged MDT | | | | |
| 26 | >>Logging interval | M | | ENUMERATED (1.28, 2.56, 5.12, 10.24, 20.48, 30.72, 40.96 and 61.44) | This IE is defined in 3GPP. Unit: [second] |
| 27 | >>Logging duration | M | | ENUMERATED (10, 20, 40, 60, 90 and 120) | This IE is defined in 3GPP. Unit: [minute] |
| 28 | PPM | O | | | Container for Paging Performance Measurements |
| 29 | ->Max Number of PPMs | O | | INTEGER (0 . . . 16) | Maximum Number of Paging Performance Measurements. |
| 30 | >Frame Offset | O | | Boolean (true, false) | Used to collect information about the offset between PICH and S-CCPCH (e.g., in case of UMTS). Value "1" indicates "activate" and value "0" indicates "do not activate". |
| 31 | >DCI Format | O | | Boolean (true, false) | Used to collect information about the DCI Format used on PDCCH (e.g., in case of LTE). Value "1" indicates "activate" and value "0" indicates "do not activate". |
| 32 | >DRX Settings | O | | Boolean (true, false) | Used to collect information about the current DRX Settings in the UE. Value "1" indicates "activate" and value "0" indicates "do not activate". |
| 33 | >DRX Status | O | | Boolean (true, false) | Used to collect information about the current DRX Status in the UE. Value "1" indicates "activate" and |

TABLE 3-continued

| | The IE defines the MDT configuration parameters. IE/Group Name | Presence | Range | IE type and reference | Semantics description |
|---|---|---|---|---|---|
| 34 | >PI Input Parameters | O | | Boolean (true, false) | value "0" indicates "do not activate". Used to collect information about the PI calculation input parameters used by the UE. Value "1" indicates "activate" and value "0" indicates "do not activate". |
| 35 | >PI Calculated Values | O | | Boolean (true, false) | Used to collect information about the PI values calculated by the UE. Value "1" indicates "activate" and value "0" indicates "do not activate". |
| 36 | >PO Input Parameters | O | | Boolean (true, false) | Used to collect information about the PO calculation input parameters used by the UE. Value "1" indicates "activate" and value "0" indicates "do not activate". |
| 37 | >PO Calculated Values | O | | Boolean (true, false) | Used to collect information about the PO values calculated by the UE. Value "1" indicates "activate" and value "0" indicates "do not activate". |
| 38 | >Paging-Message | | | | Container for Paging-Message details |
| 39 | >>Number of Paging Records | O | | Boolean (true, false) | Used to collect information about the number of paging records in the Paging-Message. Value "1" indicates "activate" and value "0" indicates "do not activate". |
| 40 | >>UE Identity | | | Boolean (true, false) | Used to collect information about the UE identity in the Paging-Message. Value "1" |

TABLE 3-continued

The IE defines the MDT configuration parameters.

| 1 | IE/Group Name | Presence | Range | IE type and reference | Semantics description |
|---|---|---|---|---|---|
| 41 | >>CN Domain Indicator | | | Boolean (true, false) | indicates "activate" and value "0" indicates "do not activate". Used to collect information about the CN domain indicator in the Paging-Message. Value "1" indicates "activate" and value "0" indicates "do not activate". |
| 42 | >>Paging Cause | | | Boolean (true, false) | Used to collect information about the paging cause in the Paging-Message. Value "1" indicates "activate" and value "0" indicates "do not activate". |

In the following, examples for using RRC signaling over the air interface to convey the paging performance measurement configuration from the base station 304 to the mobile terminal 305 are described. In the following examples, a RRC Connection Reconfiguration is used to configure and reconfigure paging performance measurements in Immediate-MDT for a UE in RRC_CONNECTED and a Logged Measurement Configuration message is used to configure paging performance measurements in Logged-MDT for a UE in RRC_IDLE.

A RRC Connection Reconfiguration message is typically used to modify an RRC connection, e.g. to establish/modify/release radio bearers, to perform handover, or to setup/modify/release measurements. As part of the procedure, NAS (Non-Access Stratum) dedicated information may be transferred from the E-UTRAN 101 to the UE 105. In the following, a possible modification of the RRC Connection Reconfiguration message is described for conveying paging performance measurement configuration information, in this example using the measConfig IE of the RRC Connection Reconfiguration which specifies the measurements to be performed by the UE and covers intra-frequency, inter-frequency and inter-RAT mobility as well as configuration of measurement gaps.

A RRC Connection Reconfiguration message as described in the following is for example transmitted in 315, wherein it is assumed for this example that the UE 305 is in RRC_CONNECTED during 315, 316, 317 and 318.

The RRC Connection Reconfiguration message according to this example for example has a structure as shown in table 4 wherein the measConfig IE has been added as shown in the $17^{th}$ line of table 4. It is transmitted by SRB1 (SRB: Signaling Radio Bearer) via the logical channel DCCH with the AM RLC-SAP (Radio Link Control-Service Access Point).

TABLE 4

```
1   -- ASN1START
2
3   RRCConnectionReconfiguration ::= SEQUENCE {
4       rrc-TransactionIdentifier              RRC-TransactionIdentifier,
5       criticalExtensions                     CHOICE {
6           c1                                     CHOICE{
7               rrcConnectionReconfiguration-r8
                RRCConnectionReconfiguration-r8-IEs,
8               spare7 NULL,
9               spare6 NULL, spare5 NULL, spare4 NULL,
10              spare3 NULL, spare2 NULL, spare1 NULL
11          },
12          criticalExtensionsFuture               SEQUENCE { }
13      }
14  }
15
16  RRCConnectionReconfiguration-r8-IEs ::= SEQUENCE {
```

TABLE 4-continued

```
17      measConfig                              MeasConfig
        OPTIONAL,   -- Need ON
18      mobilityControlInfo                     MobilityControlInfo
        OPTIONAL,   -- Cond HO
19      dedicatedInfoNASList                    SEQUENCE (SIZE(1..maxDRB)) OF
20                                                  DedicatedInfoNAS
        OPTIONAL,   -- Cond nonHO
21      radioResourceConfigDedicated            RadioResourceConfigDedicated
        OPTIONAL, -- Cond HO-toEUTRA
22      securityConfigHO                        SecurityConfigHO
        OPTIONAL,   -- Cond HO
23      nonCriticalExtension                    RRCConnectionReconfiguration-v890-
    IEs OPTIONAL
24  }
25
26  RRCConnectionReconfiguration-v890-IEs ::= SEQUENCE {
27      lateNonCriticalExtension                OCTET STRING
        OPTIONAL,   -- Need OP
28      nonCriticalExtension                    RRCConnectionReconfiguration-v920-
    IEs  OPTIONAL
29  }
30
31  RRCConnectionReconfiguration-v920-IEs ::= SEQUENCE {
32      otherConfig-r9                          OtherConfig-r9
        OPTIONAL,   -- Need ON
33      fullConfig-r9                           ENUMERATED {true}
        OPTIONAL,   -- Cond HO-Reestab
34      nonCriticalExtension                    RRCConnectionReconfiguration-v1020-
    IEs OPTIONAL
35  }
36
37  RRCConnectionReconfiguration-v1020-IEs ::= SEQUENCE {
38      sCellToReleaseList-r10                  SCellToReleaseList-r10
        OPTIONAL,   -- Need ON
39      sCellToAddModList-r10                   SCellToAddModList-r10
        OPTIONAL,   -- Need ON
40      nonCriticalExtension                    SEQUENCE { }
        OPTIONAL    -- Need OP
41  }
42
43  SCellToAddModList-r10 ::=                   SEQUENCE (SIZE (1..maxSCell-r10)) OF
    SCellToAddMod-r10
44
45  SCellToAddMod-r10 ::=                       SEQUENCE {
46      sCellIndex-r10                          SCellIndex-r10,
47      cellIdentification-r10                  SEQUENCE {
48          physCellId-r10                          PhysCellId,
49          dl-CarrierFreq-r10                      ARFCN-ValueEUTRA
50      }                                                       OPTIONAL,
51      radioResourceConfigCommonSCell-r10
            RadioResourceConfigCommonSCell-r10      OPTIONAL,  -- Cond
    SCellAdd
52      radioResourceConfigDedicatedSCell-r10
            RadioResourceConfigDedicatedSCell-r10 OPTIONAL,
53      ...
54  }
55
56  SCellToReleaseList-r10 ::=                  SEQUENCE (SIZE (1..maxSCell-r10)) OF
    SCellIndex-r10
57
58  SecurityConfigHO ::=                        SEQUENCE {
59      handoverType                            CHOICE {
60          intraLTE                                SEQUENCE {
61              securityAlgorithmConfig                 SecurityAlgorithmConfig
62              keyChangeIndicator                      BOOLEAN,
63              nextHopChainingCount                    NextHopChainingCount
64          },
65          interRAT                                SEQUENCE {
66              securityAlgorithmConfig                 SecurityAlgorithmConfig,
67              nas-SecurityParamToEUTRA                OCTET STRING (SIZE(6))
68          }
69      },
70      ...
71  }
72
73
74  -- ASN1STOP
```

The IE measConfig for example has the structure as illustrated in table 5 wherein the entries in lines 13 to 30 have been added for paging performance measurement parameters.

TABLE 5

```
1    -- ASN1START
2
3    MeasConfig ::=                      SEQUENCE {
4        -- Measurement objects
5        measObjectToRemoveList              MeasObjectToRemoveList
6        measObjectToAddModList              MeasObjectToAddModList
7        -- Reporting configurations
8        reportConfigToRemoveList            ReportConfigToRemoveList
9        reportConfigToAddModList            ReportConfigToAddModList
10       -- Measurement identities
11       measIdToRemoveList                  MeasIdToRemoveList
12       measIdToAddModList                  MeasIdToAddModList
13       -- Paging Performance Measurements configuration parameters
14       PPM ::=                             SEQUENCE {
15           MaxNumberOfPPMs                     INTEGER (0..16)
16           FrameOffset                         BOOLEAN
17           DCIFormat                       BOOLEAN
18           DRXSettings                         BOOLEAN
19           DRXStatus                       BOOLEAN
20           PIInputParameters               BOOLEAN
21           PICalculatedValues              BOOLEAN
22           POInputParameters               BOOLEAN
23           POCalculatedValues                  BOOLEAN
24           Paging-Message ::=                  SEQUENCE {
25               NumberofPagingRecords               BOOLEAN
26               UEIdentity                          BOOLEAN
27               CNDomainIndicator                   BOOLEAN
28               PagingCause                         BOOLEAN
29           }
30       }
31       -- Other parameters
32       quantityConfig                      QuantityConfig
         OPTIONAL    measGapConfig                       MeasGapConfig
33
34       s-Measure                       RSRP-Range
35
36
37           release                             NULL,
38           setup                               SEQUENCE {
39               mobilityStateParameters             MobilityStateParameters,
40               timeToTrigger-SF                    SpeedStateScaleFactors
41           }
42       }
         OPTIONAL
43       ...
44   }
45
46   MeasIdToRemoveList ::=              SEQUENCE (SIZE (1..maxMeasId))
         OF MeasId
47
48   MeasObjectToRemoveList ::=          SEQUENCE (SIZE (1..maxObjectId))
         OF MeasObjectId
49
50   ReportConfigToRemoveList ::=        SEQUENCE (SIZE
         (1..maxReportConfigId)) OF ReportConfigId
51
52
53   -- ASN1STOP
```

For paging performance measurement with Logged-MDT, i.e. in case that 317 (if performed at all) and 318 are performed when the UE 305 is in idle mode, a LoggedMeasurementConfiguration RRC message is for example used in 315 for transmitting the MDT configuration including the PPM (paging performance measurement) parameters to the UE 305. It should be noted that the acknowledgement in 316 may be omitted in this case.

The Logged Measurement Configuration RRC message is typically used by E-UTRAN 101 to configure the UE 105 to perform logging of measurement results while it is in RRC_IDLE. For transferring the logged MDT paging performance measurement configuration, the Logged Measurement Configuration RRC message for example has the structure as shown in table 6, wherein the entries in lines 23 to 40 have been added for paging performance measurement parameters. It is transmitted by SRB1 (SRB: Signaling Radio Bearer) via the logical channel DCCH with the AM RLC-SAP (Radio Link Control-Service Access Point).

TABLE 6

```
1       -- ASN1START
2
3       LoggedMeasurementConfiguration-r10 ::= SEQUENCE {
4            criticalExtensions                    CHOICE {
5                c1                                CHOICE {
6                    loggedMeasurementConfiguration-r10
                     LoggedMeasurementConfiguration-r10-IEs,
7                    spare3 NULL, spare2 NULL, spare1 NULL
8                },
9                criticalExtensionsFuture          SEQUENCE { }
10           }
11      }
12
13
14      LoggedMeasurementConfiguration-r10-IEs ::= SEQUENCE {
15           traceReference-r10                TraceReference-r10,
16           traceRecordingSessionRef-r10      OCTET STRING (SIZE (2)),
17           tce-Id-r10                        OCTET STRING (SIZE (1)),
18           absoluteTimeInfo-r10              AbsoluteTimeInfo-r10,
19           areaConfiguration-r10             AreaConfiguration-r10   OPTIONAL,
20           loggingDuration-r10                        LoggingDuration-r10,
21           loggingInterval-r10               LoggingInterval-r10,
22           nonCriticalExtension              SEQUENCE { }
             OPTIONAL   -- Need OP
23      -- Paging Performance Measurements configuration parameters
24      PPM ::=                                        SEQUENCE {
25           MaxNumberOfPPMs                              INTEGER (0..16)
26           FrameOffset                                  BOOLEAN
27           DCIFormat                                    BOOLEAN
28           DRXSettings                                  BOOLEAN
29           DRXStatus                                    BOOLEAN
30           PIInputParameters                            BOOLEAN
31           PICalculatedValues                           BOOLEAN
32           POInputParameters                            BOOLEAN
33           POCalculatedValues                           BOOLEAN
34           Paging-Message ::=                           SEQUENCE {
35               NumberofPagingRecords                    BOOLEAN
36               UEIdentity                               BOOLEAN
37               CNDomainIndicator                        BOOLEAn
38               PagingCause                              BOOLEAN
39           }
40       }
41
42      }
43
44
45
46      -- ASN1STOP
```

Figure 17:
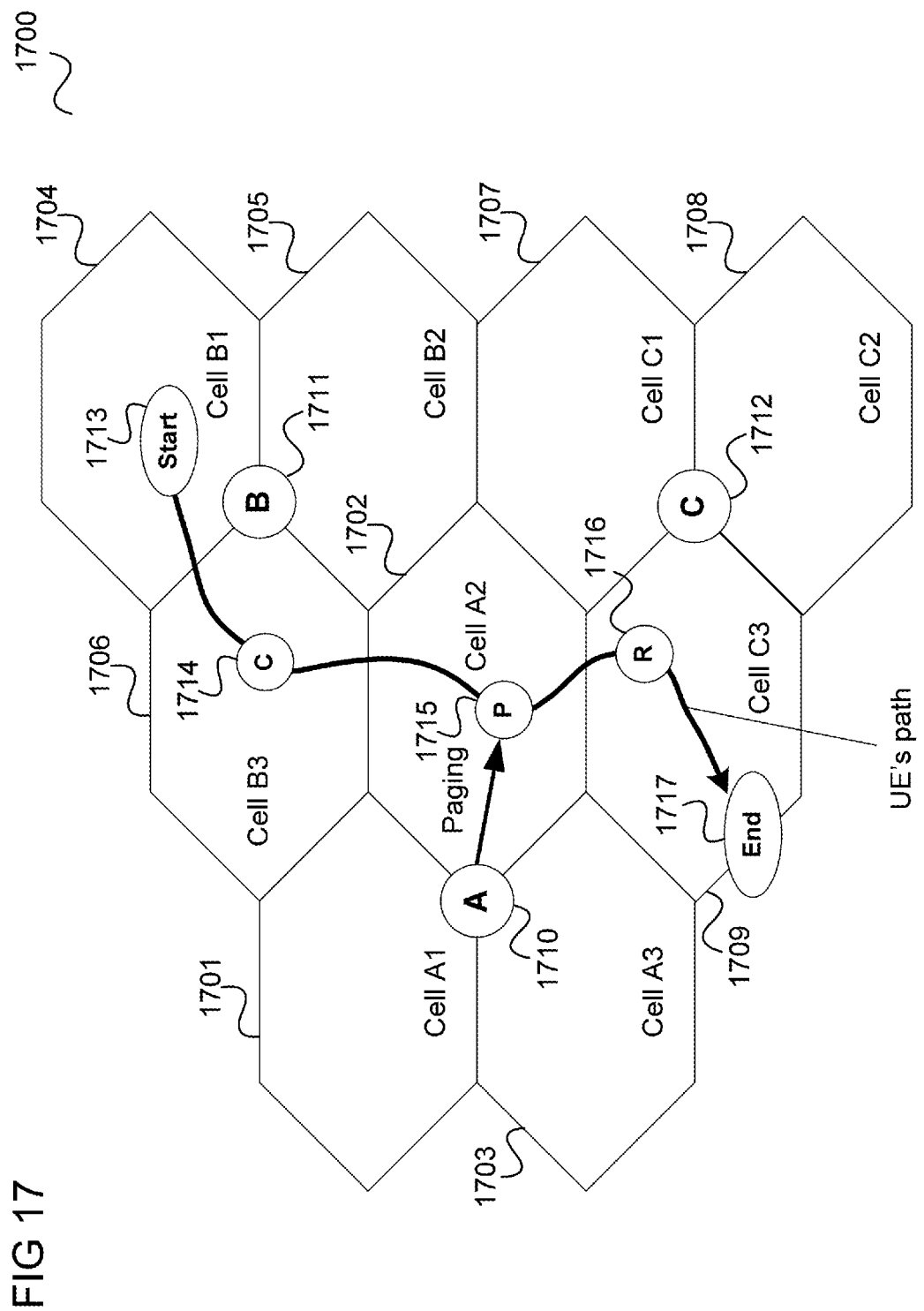
FIG. 17 shows a radio cell arrangement.

An example for a wireless network topology of a PLMN (Public Land Mobile Network) with three base stations A, B and C, each of which spans three (more or less) hexagonal radio cells and a mobile terminal performing paging performance measurements in such a scenario is given in FIG. 17.

FIG. 17 shows a radio cell arrangement 1700.

The radio cell arrangement 1700 includes a first (radio) cell 1701 (denoted as cell A1), a second cell 1702 (denoted as cell A2) and a third cell 1703 (denoted as cell A3) which are operated by a first base station 1710 (denoted as base station A).

The radio cell arrangement 1700 further includes a fourth cell 1704 (denoted as cell B1), a fifth cell 1705 (denoted as cell B2) and a sixth cell 1706 (denoted as cell B3) which are operated by a second base station 1711 (denoted as base station B).

The radio cell arrangement 1700 further includes a seventh cell 1707 (denoted as cell C1), an eighth cell 1708 (denoted as cell C2) and a ninth cell 1709 (denoted as cell C3) which are operated by a third base station 1712 (denoted as base station C).

The base stations 1710, 1711, and 1712 for example correspond to the base stations 103 and the radio cells 1701 to 1709 for example correspond to the radio cells 104.

A mobile terminal is assumed to move from a starting point 1713, via a first waypoint 1714, a second waypoint 1715 and a third waypoint 1716 to an endpoint 1717.

It is further assumed that in the course of operating the wireless communication network including the base stations 1710, 1711, 1712 the MNO (mobile network operator) noticed that paging in a certain geographical location, namely the second radio cell 1702, is very often unsuccessful. The MNO would like to find out more about this weird network behavior, so he configures one or more mobile terminals (e.g. those that are in the surrounding area and expected to traverse through the cell under surveillance (e.g., the second cell 1702)) to carry out paging performance measurements. It is assumed that the mobile terminal moving from the start point 1713 to the end point 1717 is configured by the mobile network to carry out paging performance measurements.

In one embodiment the PPM (paging performance measurement) part of the MDT configuration may contain a (list of) geographical locations (such as a list of cell-IDs, tracking areas, or coordinates defining a geographical area) in order to restrict the UE's paging performance measurement activities to a certain geographical region (e.g., to the "cell under surveillance").

The mobile terminal starts its journey through the PLMN at the starting point 1713 in the fourth cell 1704. For example, it is configured at the first waypoint 1706 to record all PF and PO input parameters as well as the PF and PO calculation results whenever new values need to be calculated (for instance, whenever new input parameters are becoming available). In addition, the mobile terminal is configured to record the UE Identity used in a received paging message. In this example, new input parameters become available when the mobile terminal enters the second cell 1702. At the second waypoint 1715, the mobile terminal receives a paging indicator followed by a paging message. According to the mobile terminal's active configuration it compiles an MDT measurement report that contains all the desired details for the MNO. At the third waypoint 1716 in the ninth cell 1709 the mobile terminal sends its MDT report, e.g. including the MDT paging performance measurement result parameters as for example described in the following to the mobile communication network, e.g. the third base station 1712 in this case. The MNO can then check based on the measurement results if the mobile terminal was correctly configured for paging, and if the paging message received by the mobile terminal was addressed to the correct group of recipients (it should be noted that the E-UTRAN may identify multiple mobile terminals within a paging message).

In this example it is assumed that the paging performance measurement configuration was part of the Immediate-MDT configuration and that the mobile terminal does not falls back to RRC_IDLE between the configuration at the first waypoint and the reporting at the third waypoint. It is further assumed that there was no separate MDT reporting trigger for reporting the paging performance measurement results (apart from "periodic reporting"), and that the configured "reporting period" terminated at the third waypoint 1716 in the ninth cell 1709. Depending on the scenario, other configurations (e.g., with dedicated reporting triggers for PPM) are possible. One alternative MDT reporting criteria could for instance be the availability of a certain number of PPM (paging performance measurement) records in the terminal.

In the following, paging performance measurement result parameters that may be included in the MDT report are described.

PPM Result Parameters in MDT Report on the UE Side

For example, RRC signaling over the air interface 106 is used to convey the paging performance measurement results from the mobile terminal 105 back to the eNB 103. The affected RRC messages for this are:

Measurement Report RRC message
 It is used for the transport of Immediate-MDT measurement results for UEs in RRC_CONNECTED,
 It may be sent from UE to eNodeB periodically or event triggered,
 It is for example transmitted in 319 from the UE 305 to the base station 304.

UE Information Response RRC Message
 It is used for the transport of Logged-MDT measurement results after the respective UE has returned back to RRC_CONNECTED,
 It is sent from the UE to the eNodeB upon NW request,
 It is for example transmitted in 319 from the UE 305 to the base station 304, e.g. in response to a UE Information Request transmitted from the base station 304 to the UE 305.

The Measurement Report RRC message for example has a structure as shown in table 7. The Measurement Report RRC message is generally used for the indication of measurement results. It is transmitted via the logical channel DCCH with the AM RLC-SAP. The IE measResults in line 16 which for example covers measured results for intra-frequency, inter-frequency and inter-RAT mobility has been included for the reporting of paging performance measurements.

TABLE 7

| 1 | -- ASN1START | |
| --- | --- | --- |
| 2 | | |
| 3 | MeasurementReport ::= | SEQUENCE { |
| 4 |  criticalExtensions | CHOICE { |
| 5 |   c1 | CHOICE{ |
| 6 |    measurementReport-r8 | MeasurementReport-r8-IEs, |
| 7 |    spare7 NULL, | |
| 8 |    spare6 NULL, spare5 NULL, spare4 NULL, | |
| 9 |    spare3 NULL, spare2 NULL, spare1 NULL | |
| 10 |   }, | |
| 11 |  criticalExtensionsFuture | SEQUENCE { } |
| 12 |  } | |
| 13 | } | |
| 14 | | |
| 15 | MeasurementReport-r8-IEs ::= | SEQUENCE { |
| 16 |  measResults | MeasResults, |
| 17 |  nonCriticalExtension | MeasurementReport-v8a0-IEs |
| 18 | } | |
| 19 | | |
| 20 | MeasurementReport-v8a0-IEs ::= SEQUENCE { | |
| 21 |  lateNonCriticalExtension | OCTET STRING OPTIONAL, |
| 22 |  nonCriticalExtension | SEQUENCE { } |
| 23 | } | |
| 24 | | |
| 25 | -- ASN1STOP | |

An example for the measResults IE is given in table 8, wherein the elements in lines 22, 125 to 141, of table 8, have been added for the reporting of paging performance measurements.

TABLE 8

```
1    -- ASN1START
2
3    MeasResuits ::=                        SEQUENCE {
4        measId                             MeasId,
5        measResultPCell                    SEQUENCE {
6            rsrpResult                         RSRP-Range,
7            rsrqResult                         RSRQ-Range
8        },
9        measResultNeighCells               CHOICE {
10           measResultListEUTRA                MeasResultListEUTRA,
11           measResultListUTRA                 MeasResultListUTRA,
12           measResultListGERAN                    MeasResultListGERAN,
13           measResultsCDMA2000                    MeasResultsCDMA2000,
14           ...
15       }
         OPTIONAL,
16       ...,
17       [[   measResultForECID-r9          MeasResultForECID-r9
         OPTIONAL
18       ]],
19       [[   locationInfo-r10              LocationInfo-r10
         OPTIONAL,
20           measResultServFreqList-r10        MeasResultServFreqList-r10
         OPTIONAL
21       ]]
22       PPMResultsList                    PPMResultsList
23   }
24
25   MeasResultListEUTRA ::=          SEQUENCE (SIZE (1..maxCellReport))
     OF MeasResultEUTRA
26
27   MeasResultEUTRA ::= SEQUENCE {
28       physCellId                         PhysCellId,
29       cgi-Info                           SEQUENCE {
30           cellGlobalId                       CellGlobalIdEUTRA,
31           trackingAreaCode                   TrackingAreaCode,
32           plmn-IdentityList                  PLMN-IdentityList2
         OPTIONAL
33       }                                                         OPTIONAL,
34       measResult                         SEQUENCE {
35           rsrpResult                         RSRP-Range
         OPTIONAL,
36           rsrqResult                         RSRQ-Range
         OPTIONAL,
37           ...,
38           [[   additionalSI-Info-r9           AdditionalSI-Info-r9
         OPTIONAL
39           ]]
40       }
41   }
42
43   MeasResultServFreqList-r10 ::=    SEQUENCE (SIZE (1..maxServCell-r10)) OF
     MeasResultServFreq-r10
44
45   MeasResultServFreq-r10 ::=         SEQUENCE {
46       servFreqId-r10                    ServCellIndex-r10,
47       measResultSCell-r10                   SEQUENCE {
48           rsrpResultSCell-r10               RSRP-Range,
49           rsrqResultSCell-r10               RSRQ-Range
50       }                                                         OPTIONAL,
51       measResultBestNeighCell-r10       SEQUENCE {
52           physCellId-r10                    PhysCellId,
53           rsrpResultNCell-r10                   RSRP-Range,
54           rsrqResultNCell-r10                   RSRQ-Range
55       }                                                         OPTIONAL,
56       ...
57   }
58
59   MeasResultListUTRA ::=            SEQUENCE (SIZE (1..maxCellReport))
     OF MeasResultUTRA
60
61   MeasResultUTRA ::= SEQUENCE {
62       physCellId                         CHOICE {
63           fdd                                PhysCellIdUTRA-FDD,
64           tdd                                PhysCellIdUTRA-TDD
65       },
66       cgi-Info                           SEQUENCE {
67           cellGlobalId                       CellGlobalIdUTRA,
68           locationAreaCode                   BIT STRING (SIZE (16))
         OPTIONAL,
```

TABLE 8-continued

| | | |
|---|---|---|
| 69 | routingAreaCode OPTIONAL, | BIT STRING (SIZE (8)) |
| 70 | plmn-IdentityList OPTIONAL | PLMN-IdentityList2 |
| 71 | } | OPTIONAL, |
| 72 | measResult | SEQUENCE { |
| 73 | utra-RSCP OPTIONAL, | INTEGER (−5..91) |
| 74 | utra-EcN0 OPTIONAL, | INTEGER (0..49) |
| 75 | ..., | |
| 76 | [[ additionalSI-Info-r9 OPTIONAL | AdditionalSI-Info-r9 |
| 77 | ]] | |
| 78 | } | |
| 79 | } | |
| 80 | | |
| 81 | MeasResultListGERAN ::= OF MeasResultGERAN | SEQUENCE (SIZE (1..maxCellReport)) |
| 82 | | |
| 83 | MeasResultGERAN ::= SEQUENCE { | |
| 84 | carrierFreq | CarrierFreqGERAN, |
| 85 | physCellId | PhysCellIdGERAN, |
| 86 | cgi-Info | SEQUENCE { |
| 87 | cellGlobalId | CellGlobalIdGERAN, |
| 88 | routingAreaCode OPTIONAL | BIT STRING (SIZE (8)) |
| 89 | } OPTIONAL, | |
| 90 | measResult | SEQUENCE { |
| 91 | rssi | INTEGER (0..63), |
| 92 | ... | |
| 93 | } | |
| 94 | } | |
| 95 | | |
| 96 | MeasResultsCDMA2000 ::= | SEQUENCE { |
| 97 | preRegistrationStatusHRPD | BOOLEAN, |
| 98 | measResultListCDMA2000 | MeasResultListCDMA2000 |
| 99 | } | |
| 100 | | |
| 101 | MeasResultListCDMA2000 ::= OF MeasResultCDMA2000 | SEQUENCE (SIZE (1..maxCellReport)) |
| 102 | | |
| 103 | MeasResultCDMA2000 ::= SEQUENCE { | |
| 104 | physCellId | PhysCellIdCDMA2000, |
| 105 | cgi-Info OPTIONAL, | CellGlobalIdCDMA2000 |
| 106 | measResult | SEQUENCE { |
| 107 | pilotPnPhase OPTIONAL, | INTEGER (0..32767) |
| 108 | pilotStrength | INTEGER (0..63), |
| 109 | ... | |
| 110 | } | |
| 111 | } | |
| 112 | | |
| 113 | MeasResultForECID-r9 ::= | SEQUENCE { |
| 114 | ue-RxTxTimeDiffResult-r9 | INTEGER (0..4095), |
| 115 | currentSFN-r9 | BIT STRING (SIZE (10)) |
| 116 | } | |
| 117 | | |
| 118 | PLMN-IdentityList2 ::= Identity | SEQUENCE (SIZE (1..5)) OF PLMN- |
| 119 | | |
| 120 | AdditionalSI-Info-r9 ::= | SEQUENCE { |
| 121 | csg-MemberStatus-r9 OPTIONAL, | ENUMERATED {member} |
| 122 | csg-Identity-r9 OPTIONAL | CSG-Identity |
| 123 | } | |
| 124 | | |
| 125 | -- Paging Performance Measurements Results | |
| 126 | PPMResultsList ::= SEQUENCE (SIZE (1.. MaxNumberOfPPMs)) OF PPMResults | |
| 127 | | |
| 128 | PPMResults ::= SEQUENCE { | |
| 129 | FrameOffset OPTIONAL, | INTEGER (1..100) |
| 130 | DCIFormat | ENUMERATED {1A, 1C} |
| 131 | DRXSettings | DRX-Config, |
| 132 | DRXStatus | ENUMERATED {on, off} |

TABLE 8-continued

|     |                         |                                          |
| --- | ----------------------- | ---------------------------------------- |
|     |                         | OPTIONAL,                                |
| 133 | PFInputParameters       | ENUMERATED {T, nB}                       |
| 134 | PFCalculatedValues      | SEQUENCE (SIZE (1..k)) OF INTEGER        |
| 135 | POInputParameters       | ENUMERATED {T, N, UE_ID, Ns}             |
| 136 | POCalculatedValues      | SEQUENCE (SIZE (1..l)) OF INTEGER        |
| 137 | NumberOfPagingRecords   | INTEGER                                  |
| 138 | UEIdentity              | PagingUE-Identity                        |
|     |                         | OPTIONAL,                                |
| 139 | CNDomainIndicator       | ENUMERATED {ps, cs}                      |
| 140 | PagingCause             | ENUMERATED {DL-Data-Arrival, MT-Call,    |
|     | PWS, ...}   OPTIONAL,   |                                          |
| 141 | }                       |                                          |
| 142 |                         |                                          |
| 143 |                         |                                          |
| 144 | -- ASN1STOP             |                                          |

The UEInformationResponse message for example has a structure as shown in table 9. It is transmitted via the logical channel DCCH with the AM RLC-SAP over SRB2 (when logged measurement information is included) or SRB1. The elements in line 87 and lines 92 to 108 have been included for the reporting of paging performance measurements.

TABLE 9

|    |                                                    |                                          |
| -- | -------------------------------------------------- | ---------------------------------------- |
| 1  | -- ASN1START                                       |                                          |
| 2  |                                                    |                                          |
| 3  | UEInformationResponse-r9 ::=                       | SEQUENCE {                               |
| 4  |     rrc-TransactionIdentifier                      | RRC-TransactionIdentifier,               |
| 5  |     criticalExtensions                             | CHOICE {                                 |
| 6  |         c1                                         | CHOICE {                                 |
| 7  |             ueInformationResponse-r9               | UEInformationResponse-r9-IEs, |
| 8  |             spare3 NULL, spare2 NULL, spare1 NULL  |                                          |
| 9  |         },                                         |                                          |
| 10 |         criticalExtensionsFuture                   | SEQUENCE { }                             |
| 11 |     }                                              |                                          |
| 12 | }                                                  |                                          |
| 13 |                                                    |                                          |
| 14 | UEInformationResponse-r9-IEs ::=                   | SEQUENCE {                               |
| 15 |     rach-Report-r9                                 | SEQUENCE {                               |
| 16 |         numberOfPreamblesSent-r9                   | INTEGER (1..200),                        |
| 17 |         contentionDetected-r9                      | BOOLEAN                                  |
| 18 |     }                                              | OPTIONAL,                                |
| 19 |     rlf-Report-r9                                  | RLF-Report-r9         OPTIONAL,          |
| 20 |     nonCriticalExtension                           | UEInformationResponse-v930-IEs           |
| 21 | }                                                  |                                          |
| 22 |                                                    |                                          |
| 23 | UEInformationResponse-v930-IEs ::= SEQUENCE {      |                                          |
| 24 |     lateNonCriticalExtension                       | OCTET STRING                             |
|    |                                                    | OPTIONAL,                                |
| 25 |     nonCriticalExtension                           | UEInformationResponse-v1020-IEs          |
| 26 | }                                                  |                                          |
| 27 |                                                    |                                          |
| 28 | UEInformationResponse-v1020-IEs ::= SEQUENCE {     |                                          |
| 29 |     logMeasReport-r10                              | LogMeasReport-r10                        |
|    |                                                    | OPTIONAL,                                |
| 30 |     nonCriticalExtension                           | SEQUENCE { }                             |
|    |                                                    | OPTIONAL                                 |
| 31 | }                                                  |                                          |
| 32 |                                                    |                                          |
| 33 | RLF-Report-r9 ::=                                  | SEQUENCE {                               |
| 34 |     measResultLastServCell-r9                      | SEQUENCE {                               |
| 35 |         rsrpResult-r9                              | RSRP-Range,                              |
| 36 |         rsrqResult-r9                              | RSRQ-Range                               |
|    |                                                    | OPTIONAL                                 |
| 37 |     },                                             |                                          |
| 38 |     measResultNeighCells-r9                        | SEQUENCE {                               |
| 39 |         measResultListEUTRA-r9                     | MeasResultList2EUTRA-r9                  |
| 40 |         measResultListUTRA-r9                      | MeasResultList2UTRA-r9                   |
| 41 |         measResultListGERAN-r9                     | MeasResultListGERAN                      |
| 42 |         measResultsCDMA2000-r9                     | MeasResultList2CDMA2000-r9               |
| 43 |     } OPTIONAL,                                    |                                          |
| 44 |     ...,                                           |                                          |
| 45 |     [[   locationInfo-r10                          | LocationInfo-r10       OPTIONAL,         |
| 46 |         failedPCellId-r10                          | CHOICE {                                 |
| 47 |             cellGlobalId-r10                       | CellGlobalIdEUTRA,                       |
| 48 |             pci-arfcn-r10                          | SEQUENCE {                               |
| 49 |                 physCellId-r10                     | PhysCellId,                              |
| 50 |                 carrierFreq-r10                    | ARFCN-ValueEUTRA                         |

TABLE 9-continued

```
51              }
52          }
        OPTIONAL,
53          reestablishmentCellId-r10            CellGlobalIdEUTRA
        OPTIONAL,
54          timeConnFailure-r10                  INTEGER (0..1023)
        OPTIONAL,
55          connectionFailureType-r10            ENUMERATED {rlf, hof}
        OPTIONAL,
56          previousPCellId-r10                  CellGlobalIdEUTRA
        OPTIONAL
57      ]]
58  }
59
60  MeasResultList2EUTRA-r9 ::=                  SEQUENCE (SIZE (1..maxFreq)) OF
    MeasResult2EUTRA-r9
61
62  MeasResult2EUTRA-r9 ::=                      SEQUENCE {
63      carrierFreq-r9                           ARFCN-ValueEUTRA,
64      measResultList-r9                        MeasResultListEUTRA
65  }
66
67  MeasResultList2UTRA-r9 ::=                   SEQUENCE (SIZE (1..maxFreq)) OF
    MeasResult2UTRA-r9
68
69  MeasResult2UTRA-r9 ::=                       SEQUENCE {
70      carrierFreq-r9                           ARFCN-ValueUTRA,
71      measResultList-r9                        MeasResultListUTRA
72  }
73
74  MeasResultList2CDMA2000-r9 ::=               SEQUENCE (SIZE (1..maxFreq)) OF
    MeasResult2CDMA2000-r9
75
76  MeasResult2CDMA2000-r9 ::=                   SEQUENCE {
77      carrierFreq-r9                           CarrierFreqCDMA2000,
78      measResultList-r9                        MeasResultsCDMA2000
79  }
80
81  LogMeasReport-r10 ::=                        SEQUENCE {
82      absoluteTimeStamp-r10                        AbsoluteTimeInfo-r10,
83      traceReference-r10                       TraceReference-r10,
84      traceRecordingSessionRef-r10             OCTET STRING (SIZE (2)),
85      tce-Id-r10                               OCTET STRING (SIZE (1)),
86      logMeasInfoList-r10                          LogMeasInfoList-r10,
87      PPMResultsList ::=                       PPMResultsList
88      logMeasAvailable-r10                     ENUMERATED {true}
        OPTIONAL,
89      ...
90  }
91
92  -- Paging Performance Measurements Results
93  PPMResultsList ::=    SEQUENCE (SIZE (1.. MaxNumberOfPPMs)) OF
    PPMResults
94
95  PPMResults ::=SEQUENCE {
96      FrameOffset                              INTEGER (1..100)
97      DCIFormat                                ENUMERATED {1A, 1C}
98      DRXSettings                              DRX-Config,
99      DRXStatus                                ENUMERATED {on, off}
100     PFInputParameters                        ENUMERATED {T, nB}
101     PFCalculatedValues                       SEQUENCE (SIZE (1..k)) OF INTEGER
102     POInputParameters                        ENUMERATED {T, N, UE_ID, Ns}
103     POCalculatedValues                       SEQUENCE (SIZE (1..l)) OF INTEGER
104     NumberOfPagingRecords                    INTEGER
105     UEIdentity                               PagingUE-Identity
        OPTIONAL,
106     CNDomainIndicator                        ENUMERATED {ps, cs}
107     PagingCause                              ENUMERATED {DL-Data-Arrival, MT-Call,
    PWS, ...}   OPTIONAL,
108 }
109
110 LogMeasInfoList-r10 ::=                      SEQUENCE (SIZE (1..maxLogMeasReport-r10))
    OF LogMeasInfo-r10
111
112 LogMeasInfo-r10 ::=   SEQUENCE {
113     locationInfo-r10                             LocationInfo-r10    OPTIONAL,
114     relativeTimeStamp-r10                    INTEGER (0..7200),
115     servCellIdentity-r10                     CellGlobalIdEUTRA,
116     measResultServCell-r10                       SEQUENCE {
117         rsrpResult-r10                           RSRP-Range,
```

TABLE 9-continued

```
118            rsrqResult-r10                          RSRQ-Range
119        },
120    }
121
122
123        measResultNeighCells-r10                    SEQUENCE {
124            measResultListEUTRA-r10                     MeasResultList2EUTRA-r9
125            measResultListUTRA-r10                      MeasResultList2UTRA-r9
    OPTIONAL,
126            measResultListGERAN-r10                         MeasResultList2GERAN-r10
127            measResultListCDMA2000-r10                      MeasResultList2CDMA2000-
    r9 OPTIONAL
128        } OPTIONAL,
129        ...
130    }
131
132    MeasResultList2GERAN-r10 ::=                     SEQUENCE (SIZE
    (1..maxCellListGERAN)) OF MeasResultListGERAN
133
134    -- ASN1STOP
```

PPM Result Parameters in MDT Report on the Network Side

For example, in case of Immediate-MDT, whenever the base station 304 (or the RNC) receives the MDT measurements from the UE 305 in RRC_CONNECTED, it saves it to a Trace Record.

In case of Logged MDT, the UE 305 for example collects the measurements as long as it is in RRC_IDLE. Once the UE 305 goes to RRC_CONNECTED mode, the UE 305 indicates MDT log availability in a RRCConnectionSetupComplete RRC message to the base station 304 (or the RNC). When the base station 304 (or the RNC) receives this indication it can request the MDT log (if the UE 305 is still in the same RAT type where the MDT configuration was done, or in another RAT that qualifies for MDT log retrieval) by sending a UEInformationRequest RRC message to the UE 305. The UE 305 sends the MDT logs (i.e. the MDT measurement report) to the network in the UEInformationResponse RRC message in 319. At the reception of the UEInformationResponse RRC message the base station 304 (or the RNC) saves the received MDT log to the Trace Record in 320.

The Trace Record is then sent to the TCE 330 by means of a core network message sequence in 321 and 322 via the EM 301. It should be noted that there are certain deployment scenarios where the EM 301 resides inside the RNC (in case of UMTS), or inside the eNodeB 304 (in case of LTE).

The time and criteria when the Trace Records are sent to the EM 301 or TCE 330 may be vendor specific. However, if the Trace Session is deactivated, the Trace Records is for example sent to the EM 301 or TCE 330 latest by 2 hours after the Trace Session deactivation.

In the trace-based MDT reporting at least one parameter may be added to inform the EM 301 or TCE 330 about the paging performance measurement results. For example, additional pieces of information are added to the Trace Record message that are sent in 321 and/or 322. In doing so the MDT Reports for the paging performance measurements use case can be propagated from the base station 304 via the EM 301 (Element Manager) in one or two steps to the TCE 330.

For this either the S1AP (defined for the S1 interface between MME 109 and eNodeB 103 in case of LTE) may be modified in order to convey the MDT Report (i.e. the PPM results) or a protocol is specified (for example defined for the interface(s) between base station 304 and TCE 330).

A possible structure for reporting the data collected during paging performance measurements on the network side is given in table 10.

TABLE 10

| The IE defines the MDT reporting parameters. | Presence | Range | IE type | Semantics description |
| --- | --- | --- | --- | --- |
| . | . | . | . | . |
| . | . | . | . | . |
| . | . | . | . | . |
| PPM | O | | | Container for Paging Performance Measurements |
| >Record Number | | | INTEGER | Used to provide a unique record identifier for each set of PPM results. |
| >Frame Offset | O | | INTEGER (1 ... 100) | Used to indicate the offset between PICH frame and associated S-CCPCH frame (in case of UMTS). |
| >DCI Format | O | | ENUMERATED (1A, 1C) | Used to indicate the DCI format on PDCCH for the Paging Indicator (in case of LTE). |

TABLE 10-continued

| The IE defines the MDT reporting parameters. | Presence | Range | IE type | Semantics description |
|---|---|---|---|---|
| >DRX Settings | O | | | Used to indicate the UE's current DRX configuration settings. This IE is defined in 3GPP. |
| >DRX Status | O | | ENUMERATED (on, off) | Used to indicate the UE's current DRX status. |
| >PF Input Parameters | O | | ENUMERATED (T, nB) | Used to indicate the Paging Frame parameters used by the UE for calculation. |
| >PF Calculated Values | O | | SEQUENCE (SIZE (1 . . . k)) OF INTEGER | Used to indicate the Paging Frame calculation results used by the UE. |
| >PO Input Parameters | O | | ENUMERATED (T, N, UE_ID, Ns) | Used to indicate the Paging Occasion parameters used by the UE for calculation. |
| >PO Calculated Values | O | | SEQUENCE (SIZE (1 . . . l)) OF INTEGER | Used to indicate the Paging Occasion calculation results used by the UE. |
| >Number Of Paging Records | O | | INTEGER | Used to provide the number of paging records in the Paging-Message received by the UE. |
| >UE Identity | O | | PagingUE-Identity | Used to provide a list of UE identities as given in the Paging-Message received by the UE. (Note: E-UTRAN may identify multiple UEs within a Paging-Message.) This IE is defined in 3GPP. |
| >CN Domain Indicator | O | | ENUMERATED (ps, cs) | Used to provide the Core Network Domain Indicator as given in the Paging-Message received by the UE. |
| >Paging Cause | O | | ENUMERATED (DL-Data-Arrival, MT-Call, PWS, . . . ) | Used to provide the Paging Cause as given in the Paging-Message received by the UE. |
| . . . | . . . | . . . | . . . | . . . |

Regarding the propagation of the paging performance measurement configuration, the paging performance measurement is for example made an integral part of the MDT configuration. Thus, in case of Immediate-MDT the paging performance measurement configuration parameters for a UE are for example transferred from a source eNB/RNC (i.e. a source cell) to a target eNB/RNC (i.e. a target cell) as follows:

The eNB/RNC activates the Immediate-MDT in the UE if the area based selection conditions are satisfied or—after a handover that is made over X2 or S1 (or over Iur or Iu in case of UMTS)—in the target cell. If the area based selection conditions are not satisfied in the handover target cell, the eNB/RNC may deactivate the Immediate-MDT operations in the UE. The trace sessions and trace recording sessions are for example not visible for the UE.

In case of signaling based trace activation (subscription based MDT), the eNB/RNC propagates the Trace Session parameters together with the MDT specific parameters (including the parameters for the paging performance measurements) to the target cell regardless of whether the source or target cell is part of the configured area scope in case of an Intra-PLMN handover over X2 or S1 (or Iur or Iu in case of UMTS).

In case of UTRAN the RNC propagates the Trace Session of the UE to the target cell in case of a handover over Iur or Iu. Any trace recording session is maintained, stopped or started in the target cell according to the evaluation of the selection criteria. This includes the behavior and parameters for the paging performance measurements.

In Logged-MDT mode, no propagation of the MDT configuration is for example performed.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
a message generator configured to generate a message indicating that a mobile terminal should provide data from which information about the configuration of the mobile terminal for the reception of paging messages is derivable, wherein the message indicates that the mobile terminal should provide a value of a paging parameter used by the mobile terminal to receive paging messages, the paging parameter to be a Paging Indicator Channel (PICH) frame to Secondary Common Control Physical Channel (S-CCPCH) frame association offsets, Downlink Control Information (DCI) format used on Physical Downlink Control Channel (PDCCH), Discontinuous Reception (DRX) information, paging frame calculation information, paging occasion information, or Long Term Evolution (LTE) Paging-Message content information; wherein the DRX information includes at least one of configuration settings in the mobile terminal associated with DRX and DRX status at a time of paging, the paging frame calculation information includes at least one of an input parameter used by the mobile terminal for paging frame calculation and a calculation result associated with a paging frame applied in the mobile terminal, the paging occasion information includes at least one of an input parameter used by the mobile terminal for paging occasion calculation and a calculation result associated with a paging occasion applied in the mobile terminal, and the LTE Paging-Message content information includes at least one of a number of Paging Records in the Paging-Message, an identity of the mobile terminal used by a network to address the mobile terminal, a core network (CN) domain indicator, and a paging cause associated with the Paging-Message; and
a transmitter configured to transmit the message.

2. The communication device according to claim 1, wherein the transmitter is configured to transmit the message to the mobile terminal.

3. The communication device according to claim 1, wherein the message indicates that the mobile terminal should provide data from which information about the configuration of the mobile terminal for the reception of paging messages is derivable.

4. The communication device according to claim 1, wherein the message indicates that the mobile terminal should provide data including information about the behavior of the mobile terminal in the event of paging.

5. The communication device of claim 1, wherein the message indicates that the mobile terminal should provide data from which the configuration of the mobile terminal for the reception of paging messages is derivable.

6. The communication device of claim 1, wherein the message indicates that the mobile terminal should provide data from which it is derivable whether the configuration of the mobile terminal for the reception of paging messages is correct.

7. The communication device according to claim 1, wherein the message indicates that the mobile terminal should provide information from which it is derivable whether the paging message reception process performed by the mobile terminal was erroneous.

8. The communication device of claim 1, wherein the message indicates that the mobile terminal should provide information from which it is derivable which part of the paging message reception process performed by the mobile terminal was erroneous.

9. The communication device of claim 1, wherein the message indicates that the mobile terminal should provide at least a part of the content of a received paging message.

10. The communication device of claim 1, wherein the message indicates that the mobile terminal should provide at least one of a paging parameter used by the mobile terminal to receive paging messages and at least a part of the content of a received paging message.

11. The communication device of claim 1, wherein the communication device is a base station.

12. The communication device of claim 1, wherein the communication device is part of a communication network and the message indicates that the mobile terminal should provide data from which it is derivable whether the mobile terminal is correctly configured to receive paging messages from the communication network.

13. The communication device of claim 1, wherein the message generator is configured to generate the message in accordance with MDT and the transmitter is configured to transmit the message in accordance with MDT.

14. The communication device according to claim 1, wherein the communication device is part of the network side of a wireless communication system and the transmitter is configured to transmit the message to another communication device of the network side of the wireless communication system.

15. Method for requesting information comprising:
generating a message indicating that a mobile terminal should provide data from which information about the configuration of the mobile terminal for the reception of paging messages is derivable, wherein the message indicates that the mobile terminal should provide a value of a paging parameter used by the mobile terminal to receive paging messages, the paging parameter to be a Paging Indicator Channel (PICH) frame to Secondary Common Control Physical Channel (S-CCPCH) frame association offsets, Downlink Control Information (DCI) format used on Physical Downlink Control Channel (PDCCH), Discontinuous Reception (DRX) information, paging frame calculation information, paging occasion information, or Long Term Evolution (LTE) Paging-Message content information; wherein the DRX information includes at least one of configuration settings in the mobile terminal associated with DRX and DRX status at a time of paging, the paging frame calculation information includes at least one of an input parameter used by the mobile terminal for paging frame calculation and a calculation result associated with a paging frame applied in the mobile terminal, the paging occasion information includes at least one of an input parameter used by the mobile terminal for paging occasion calculation and a calculation result associated with a paging occasion applied in the mobile terminal, and the LTE Paging-Message content information includes at least one of a number of Paging Records in the Paging-Message, an identity of the mobile terminal used by a network to address the mobile terminal, a core network (CN) domain indicator, and a paging cause associated with the Paging-Message; and transmitting the message.

16. The method according to claim 15, comprising transmitting the message to the mobile terminal.

17. Mobile terminal comprising:
- a receiver configured to receive a message indicating to the mobile terminal that the mobile terminal should provide data from which information about the configuration of the mobile terminal for the reception of paging messages is derivable, wherein the message indicates that the mobile terminal should provide a value of a paging
- parameter used by the mobile terminal to receive paging messages, the paging parameter to be a Paging Indicator Channel (PICH) frame to Secondary Common Control Physical Channel (S-CCPCH) frame association offsets, Downlink Control Information (DCI) format used on Physical Downlink Control Channel (PDCCH), Discontinuous Reception (DRX) information, paging frame calculation information, paging occasion information, or Long Term Evolution (LTE) Paging-Message content information, wherein the DRX information includes at least one of configuration settings in the mobile terminal associated with DRX and DRX status at a time of paging, the paging frame calculation information includes at least one of an input parameter used by the mobile terminal for paging frame calculation and a calculation result associated with a paging frame applied in the mobile terminal, the paging occasion information includes at least one of an input parameter used by the mobile terminal for paging occasion calculation and a calculation result associated with a paging occasion applied in the mobile terminal, and the LTE Paging-Message content information includes at least one of a number of Paging Records in the Paging-Message, an identity of the mobile terminal used by a network to address the mobile terminal, a core network (CN) domain indicator, and a paging cause associated with the Paging-Message;
- a determiner configured to determine data from which information about the configuration of the mobile terminal for the reception of paging messages is derivable; and
- a transmitter configured to transmit the data to a communication device.

18. The mobile terminal according to claim 17, wherein the receiver is configured to receive the message from the communication device.

19. The mobile terminal according to claim 17, wherein the message indicates that the mobile terminal should provide data from which information about the configuration of the mobile terminal for the reception of paging messages is derivable.

20. The mobile terminal according to claim 17, wherein the message indicates that the mobile terminal should provide data including information about the behavior of the mobile terminal in the event of paging.

21. Method for providing information comprising:

receiving a message indicating to a mobile terminal that the mobile terminal should provide data from which information about the configuration of the mobile terminal for the reception of paging messages is derivable, wherein the message indicates that the mobile terminal should provide a value of a paging parameter used by the mobile terminal to receive paging messages, the paging parameter to be a Paging Indicator Channel (PICH) frame to Secondary Common Control Physical Channel (S-CCPCH) frame association offsets, Downlink Control Information (DCI) format used on Physical Downlink Control Channel (PDCCH), Discontinuous Reception (DRX) information, paging frame calculation information, paging occasion information, or Long Term Evolution (LTE) Paging-Message content information, wherein the DRX information includes at least one of configuration settings in the mobile terminal associated with DRX and DRX status at a time of paging, the paging frame calculation information includes at least one of an input parameter used by the mobile terminal for paging frame calculation and a calculation result associated with a paging frame applied in the mobile terminal, the paging occasion information includes at least one of an input parameter used by the mobile terminal for paging occasion calculation and a calculation result associated with a paging occasion applied in the mobile terminal, and the LTE Paging-Message content information includes at least one of a number of Paging Records in the Paging-Message, an identity of the mobile terminal used by a network to address the mobile terminal, a core network (CN) domain indicator, and a paging cause associated with the Paging-Message;

determining data from which information about the configuration of the mobile terminal for the reception of paging messages is derivable; and transmitting the data to a communication device.

22. The method of claim 21 comprising receiving the message from the communication device.

* * * * *